No. 783,543. PATENTED FEB. 28, 1905.
A. F. RIETZEL.
ELECTRIC CHAIN WELDING MACHINE.
APPLICATION FILED OCT. 15, 1903.
10 SHEETS—SHEET 1.
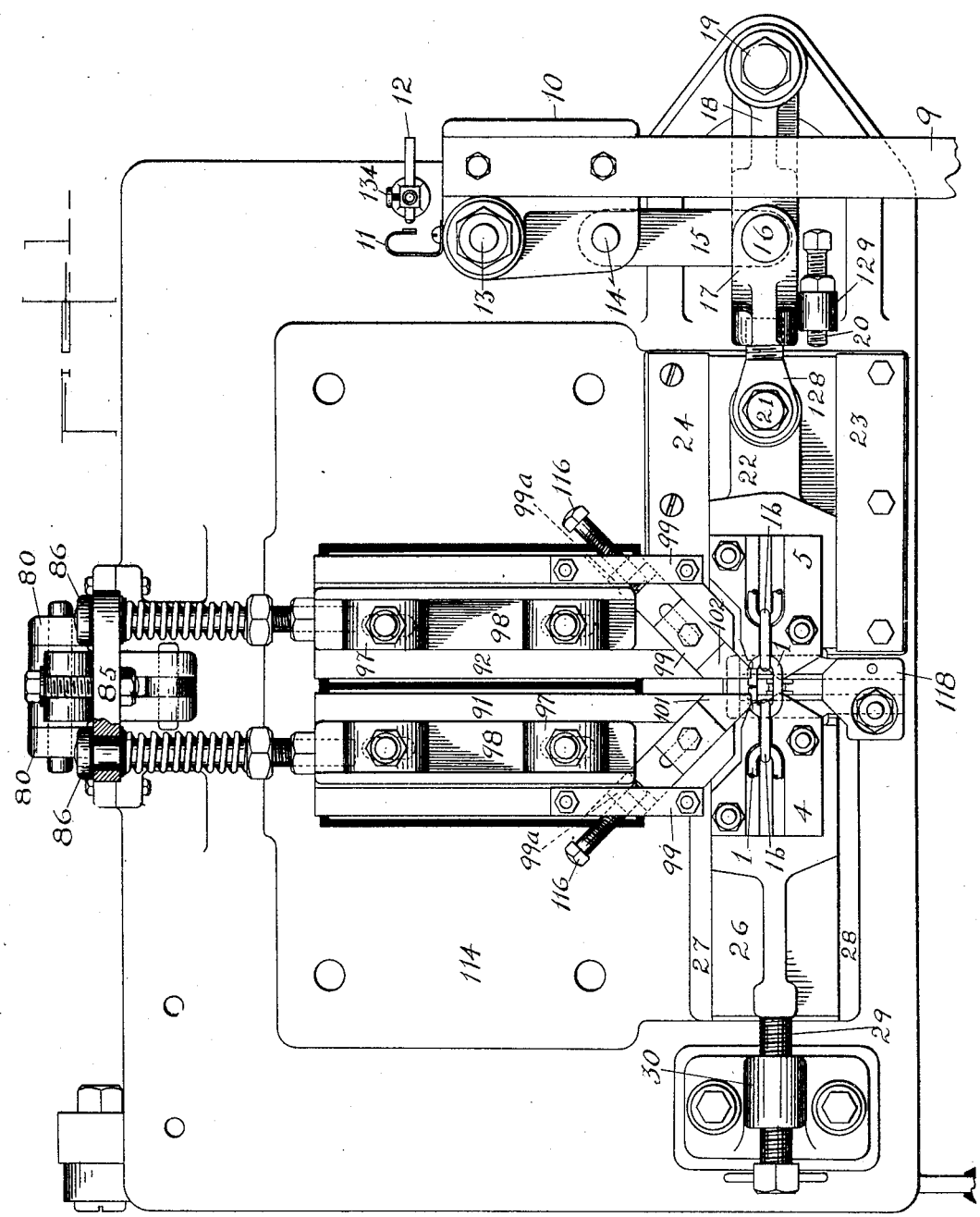
WITNESSES:
INVENTOR
Adolph F. Rietzel.
BY
Townsend & Decker
ATTORNEYS

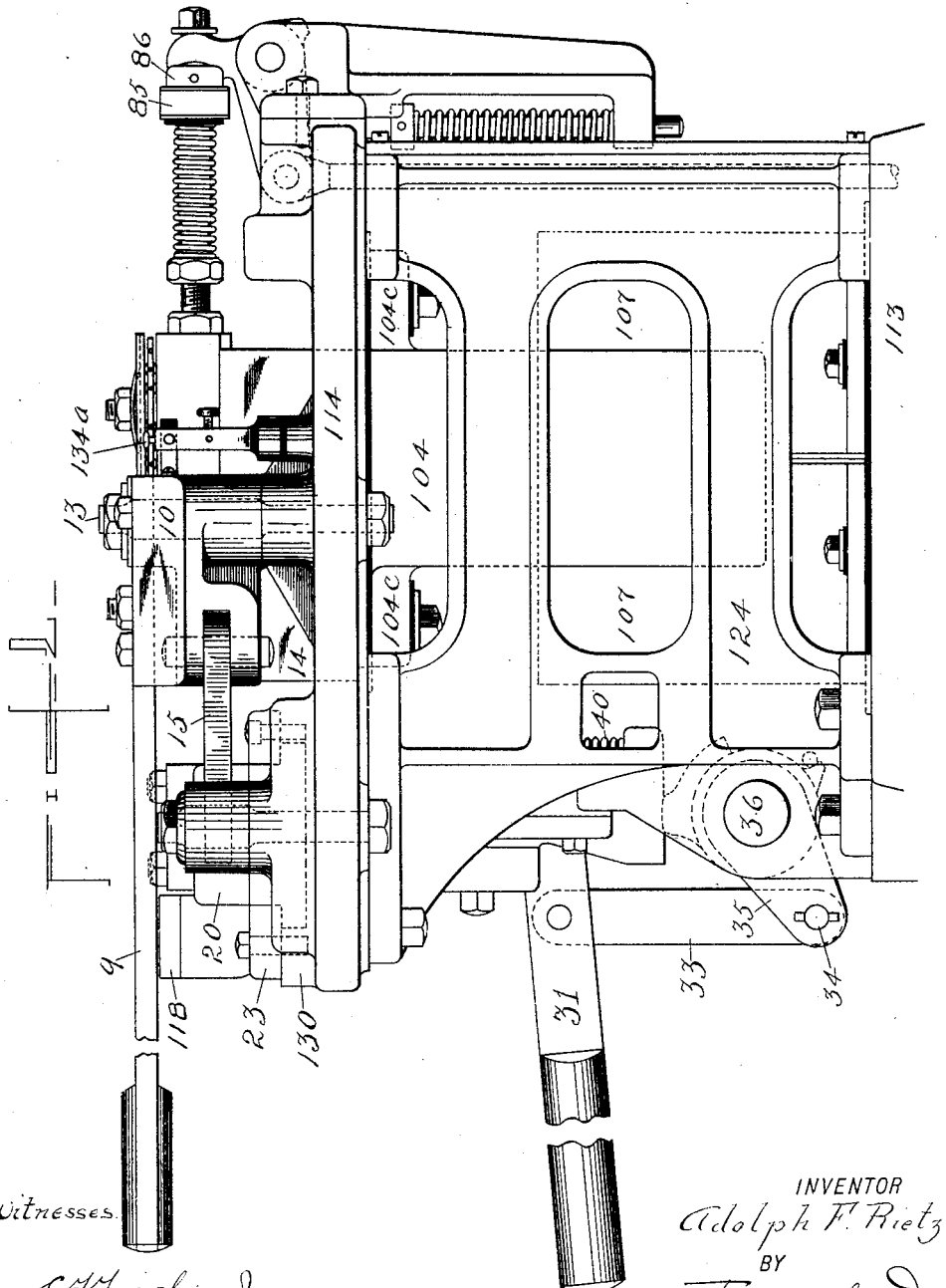

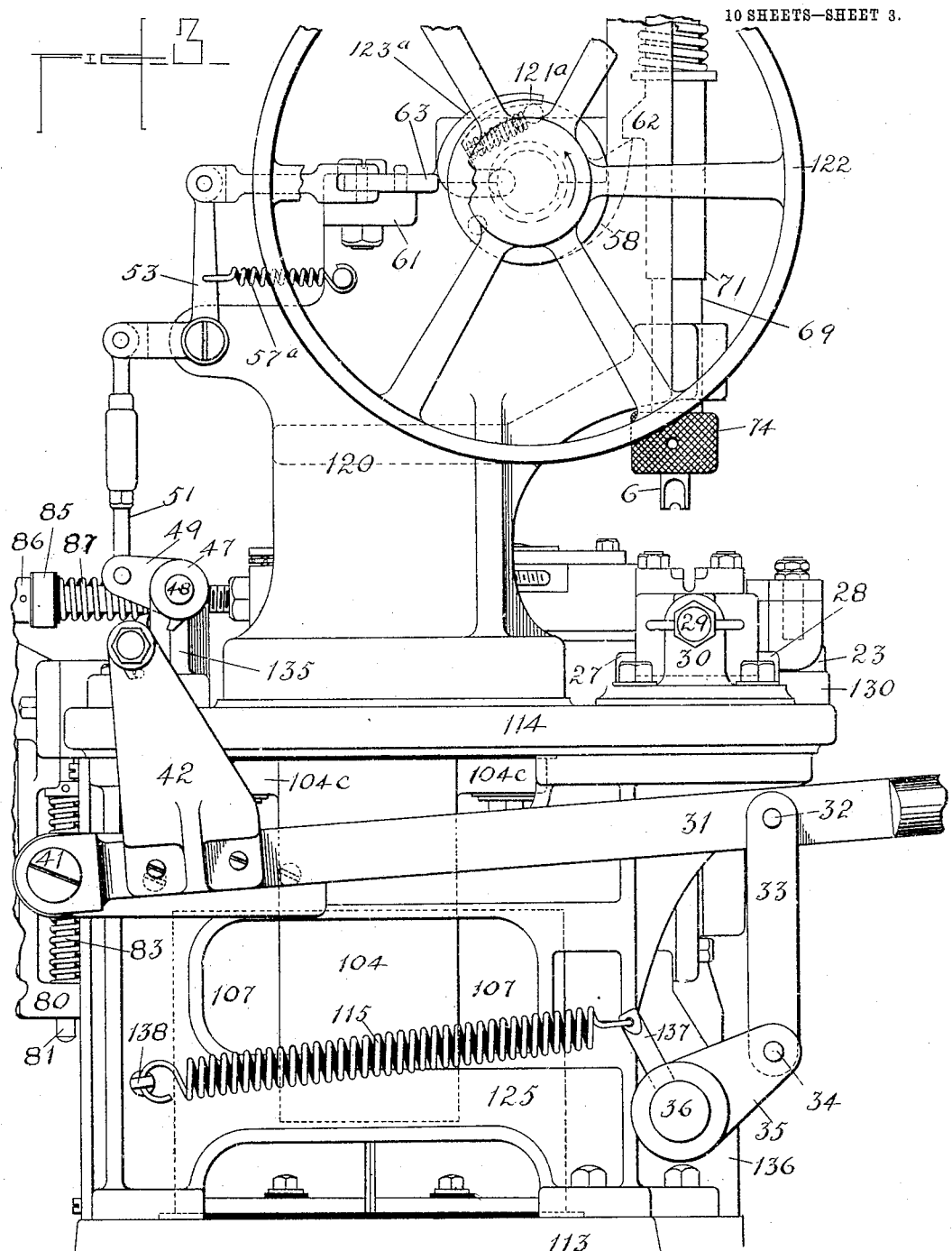

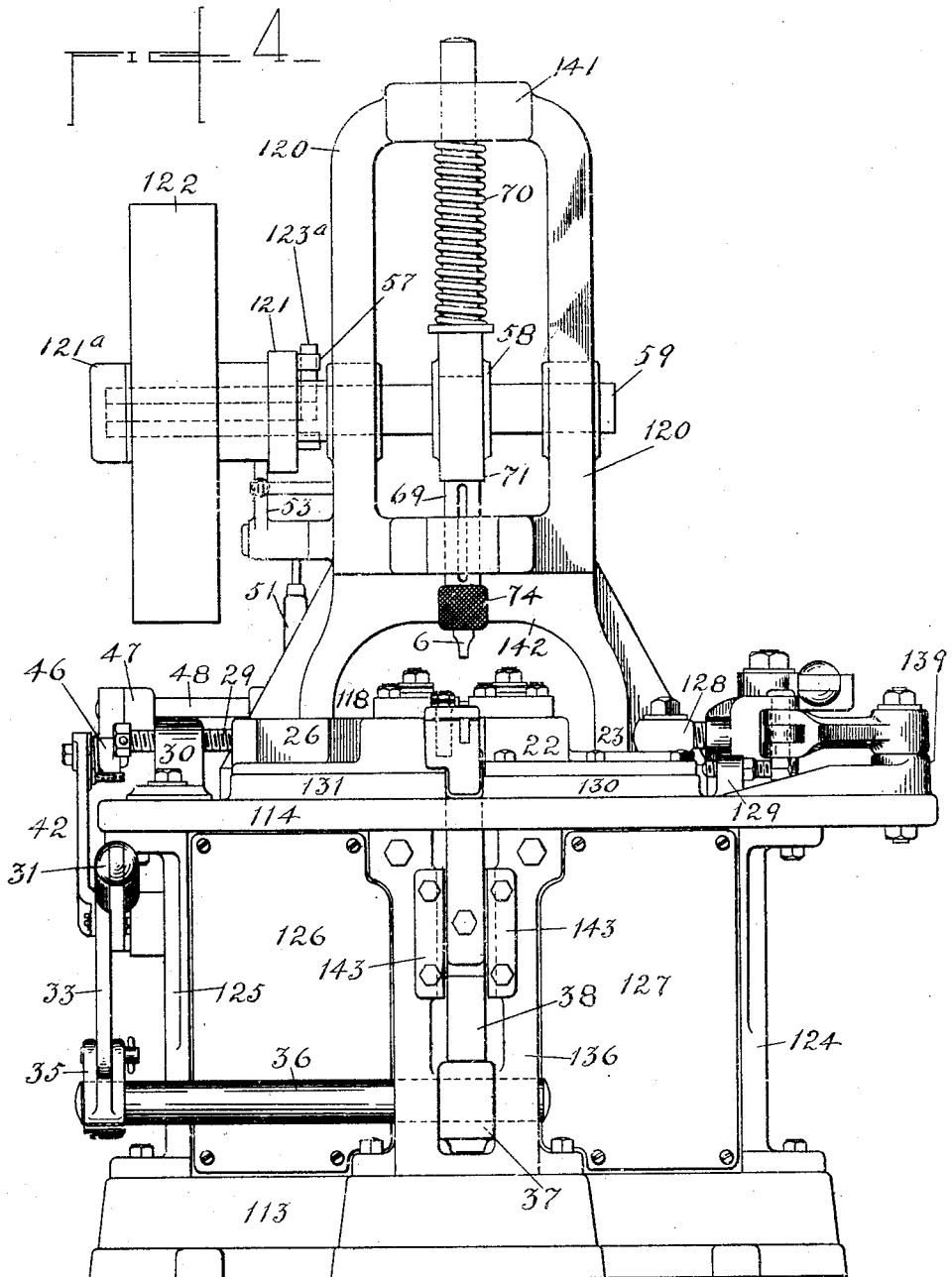

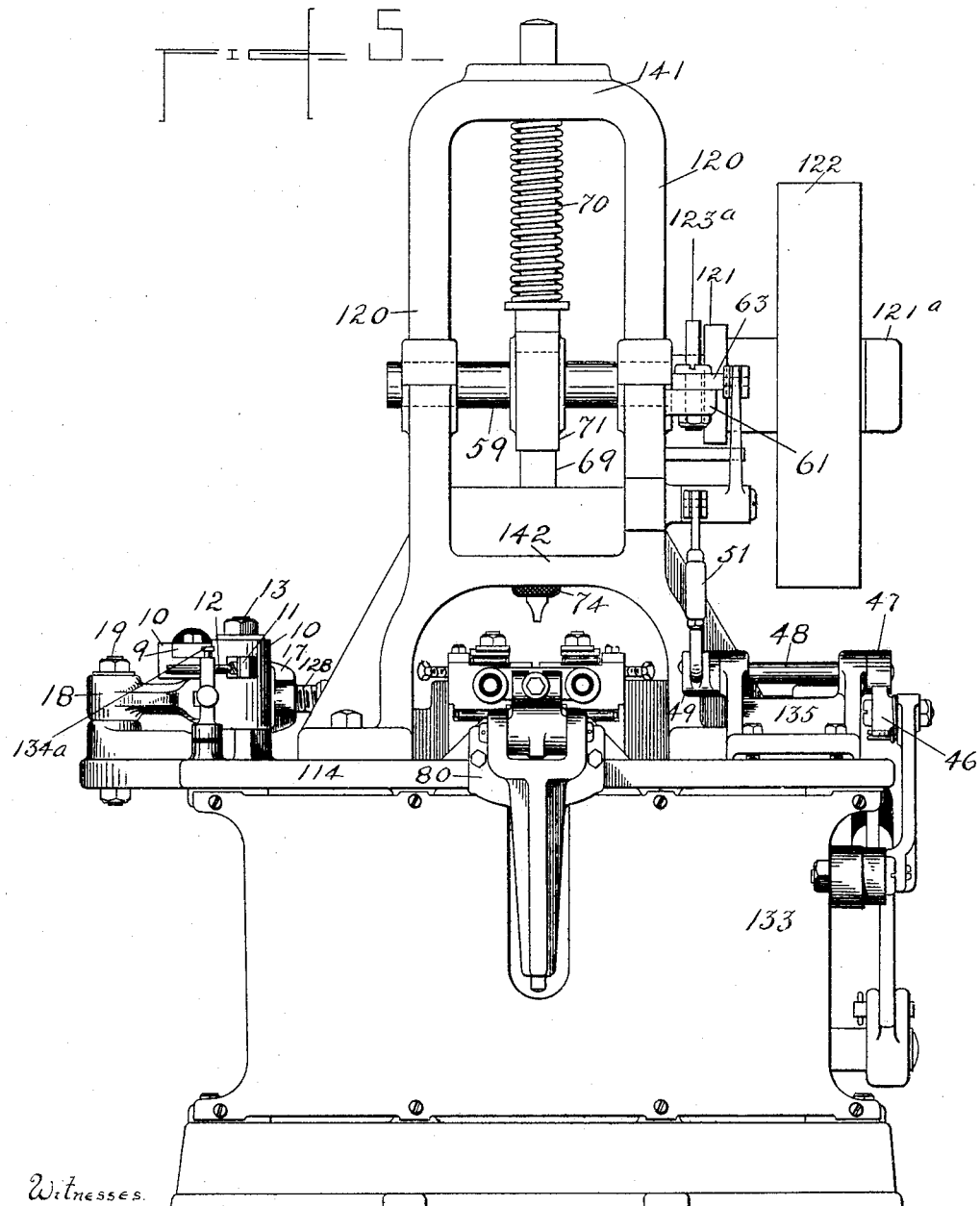

No. 783,543. PATENTED FEB. 28, 1905.
A. F. RIETZEL.
ELECTRIC CHAIN WELDING MACHINE.
APPLICATION FILED OCT. 15, 1903.
10 SHEETS—SHEET 6.
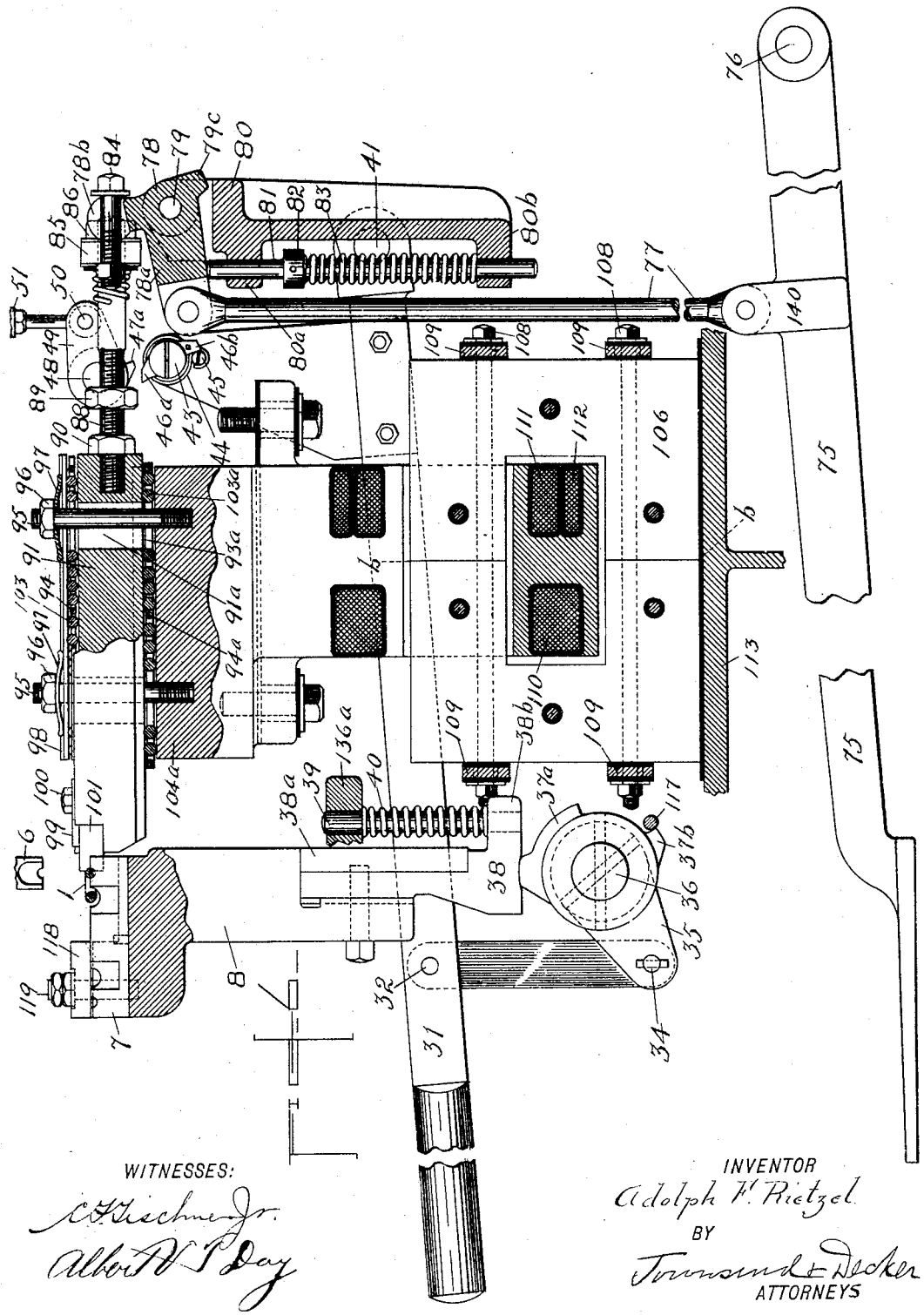
WITNESSES:
INVENTOR
Adolph F. Rietzel
BY
Townsend & Decker
ATTORNEYS

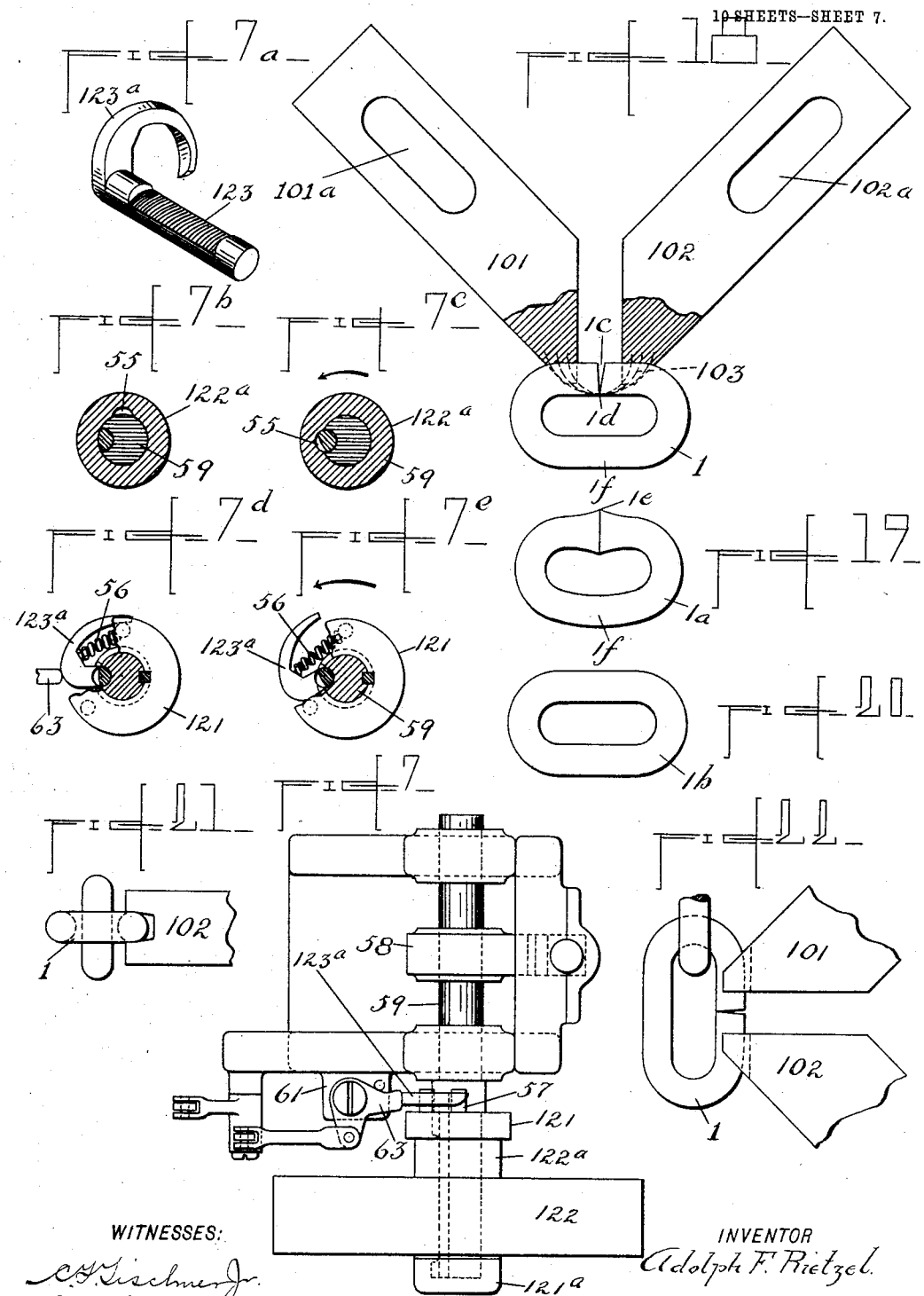

No. 783,543. PATENTED FEB. 28, 1905.
A. F. RIETZEL.
ELECTRIC CHAIN WELDING MACHINE.
APPLICATION FILED OCT. 15, 1903.
10 SHEETS—SHEET 8.
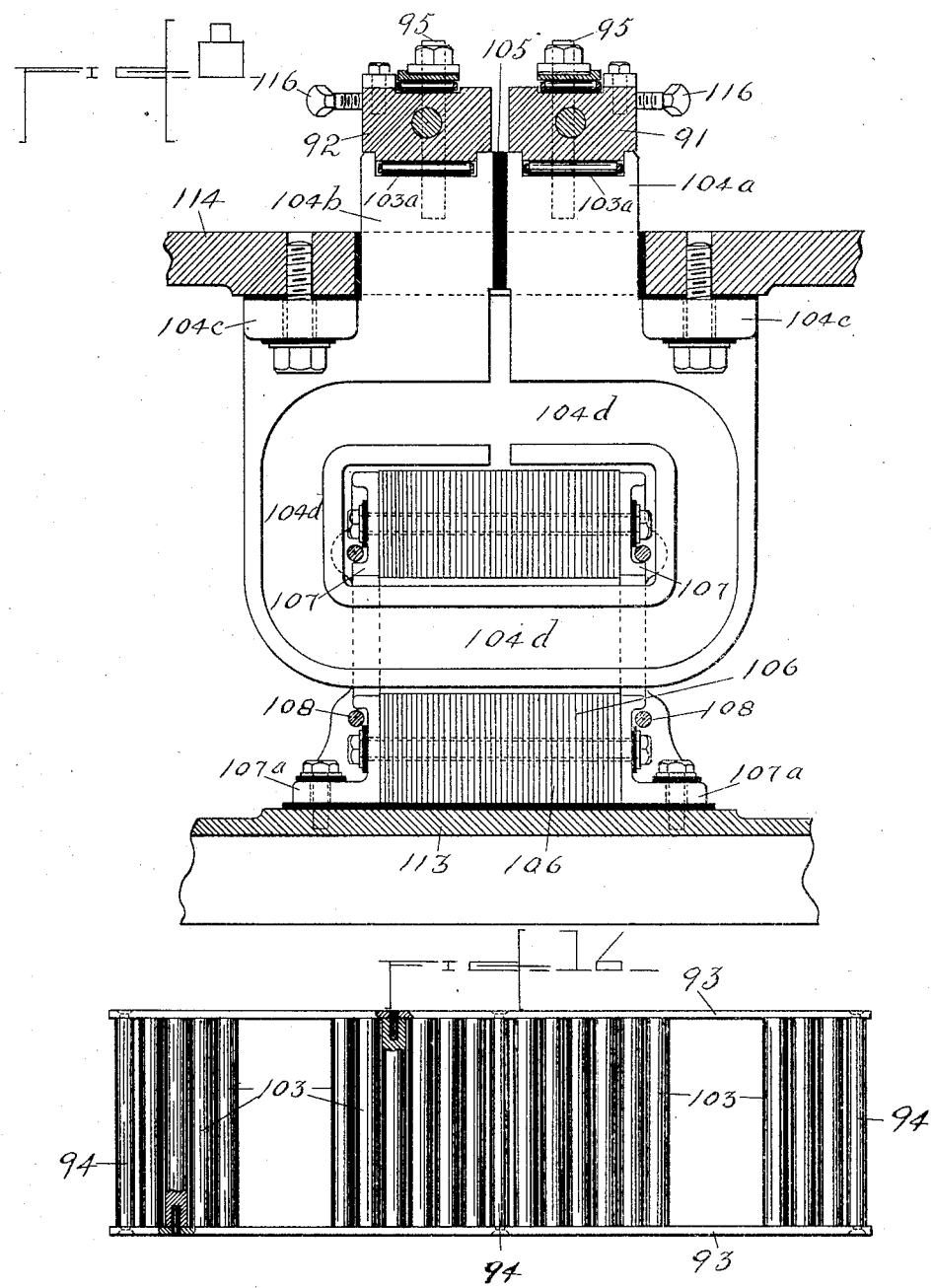
WITNESSES:
INVENTOR
Adolph F. Rietzel
BY
Townsend Decker
ATTORNEYS No. 783,543. PATENTED FEB. 28, 1905.
A. F. RIETZEL.
ELECTRIC CHAIN WELDING MACHINE.
APPLICATION FILED OCT. 15, 1903.
10 SHEETS—SHEET 9.
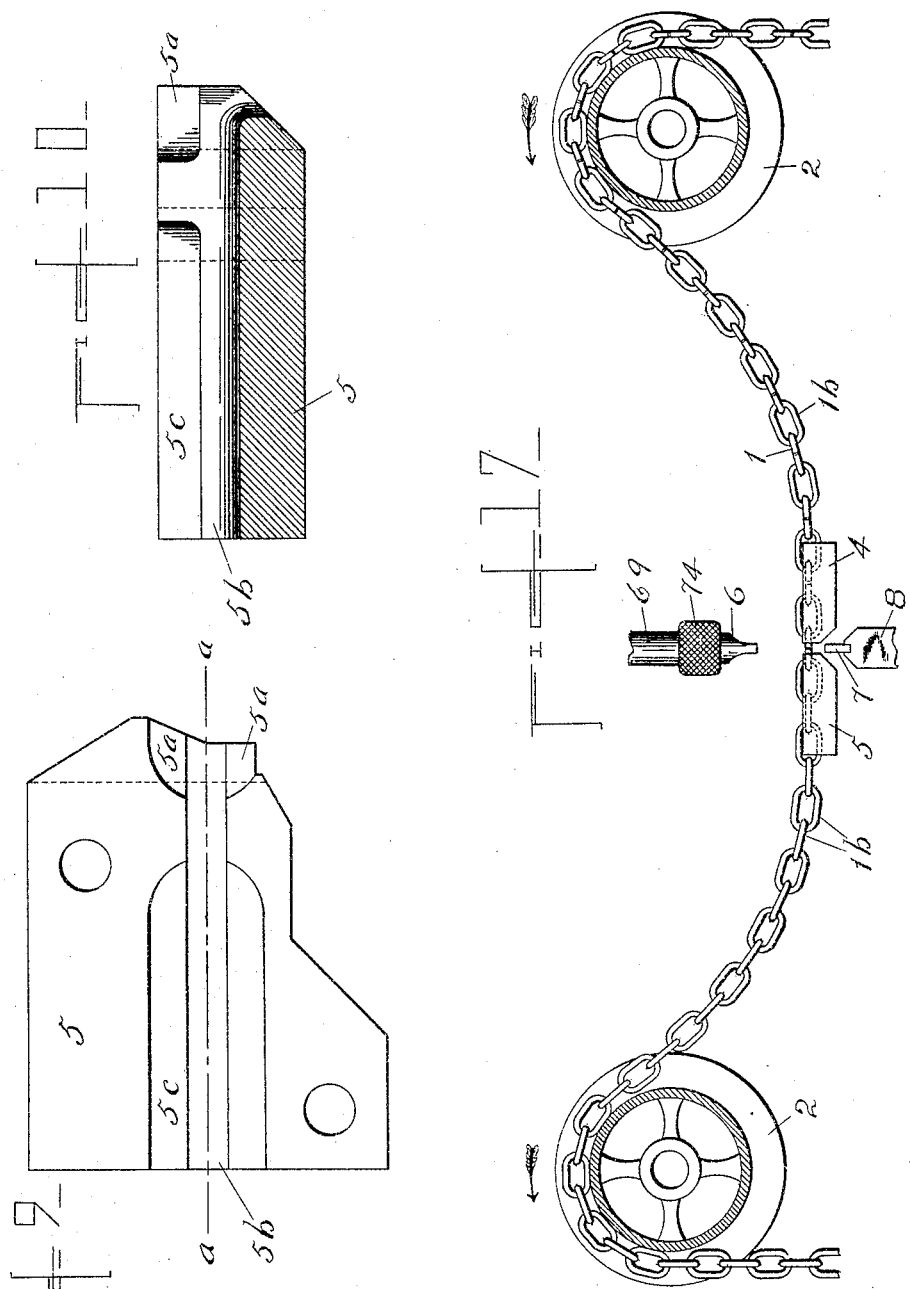
WITNESSES:
INVENTOR
Adolph F. Rietzel.
BY
Townsend & Decker
ATTORNEYS

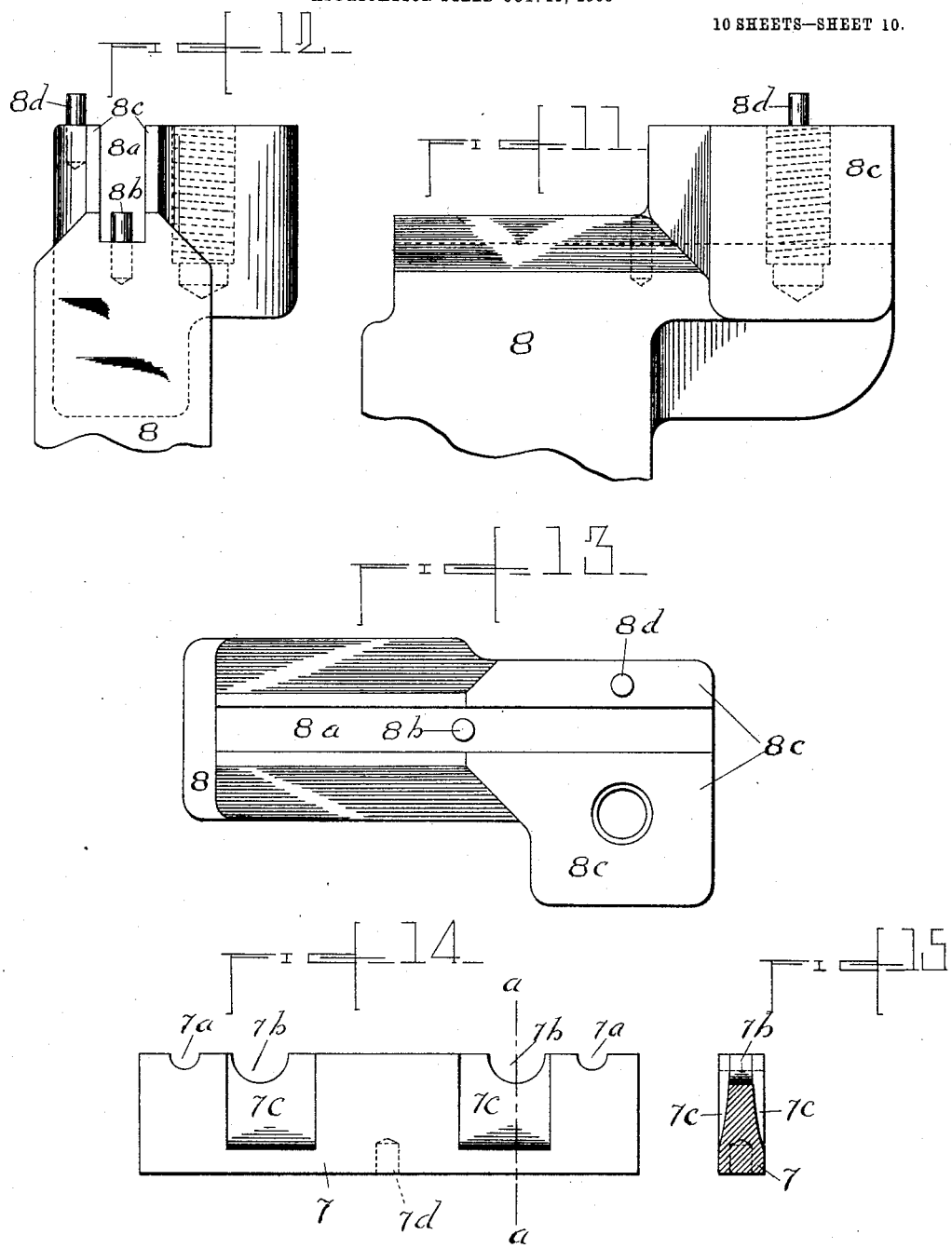

No. 783,543.                                              Patented February 28, 1905.

UNITED STATES PATENT OFFICE.

ADOLPH F. RIETZEL, OF LYNN, MASSACHUSETTS, ASSIGNOR TO THOMSON ELECTRIC WELDING COMPANY, OF LYNN, MASSACHUSETTS, A CORPORATION OF MAINE.

ELECTRIC CHAIN-WELDING MACHINE.

SPECIFICATION forming part of Letters Patent No. 783,543, dated February 28, 1905.

Application filed October 15, 1903. Serial No. 177,140.

*To all whom it may concern:*

Be it known that I, ADOLPH F. RIETZEL, a citizen of the United States, and a resident of Lynn, in the county of Essex and State of Massachusetts, have invented certain new and useful Improvements in Electric Chain-Welding Machines, of which the following is a specification.

My invention relates to that class of electric metal-working apparatus in which the heating power of an electric current is used to reduce the metal to a semiplastic condition for the purpose of permitting the same to be forged, shaped, welded, or otherwise worked, as well understood in the art.

While my invention is primarily designed as an improvement in electric welding apparatus, it is in some of its features applicable also to machines whose work-holders or other appliances are constructed with special reference to the use of the machine for other metal-working operations.

In the following specification I shall describe my invention more particularly as carried out in a machine organized for electric welding, and particularly for the operation of welding endless shapes of metal, like the links of a chain.

One part of my invention relates to the form or construction of the work-holder of the machine. Heretofore in this class of machines it has been usual to employ clamping devices which require to be manipulated prior to the operation of the machine, said clamping devices being mounted upon the work-holding slides or carriers. This part of my invention consists of a work-holder adapted by the conformation of its work engaging or holding surfaces to properly locate the work in the machine and to effect a clamping of the same by the usual pressure applied to the work-holding slide for the purpose of welding or upsetting the work. This part of my invention is particularly useful for welding the links of chains or for welding other endless forms of metal, since all that is necessary is to place the piece of work in the holders and then without any further manipulation of clamping devices to apply the necessary end pressure as usual in the art to affect the heated work.

Another part of my invention relates to an improved means for hammering or subjecting the work to other mechanical forging or shaping operation applied thereto after it has been subjected to the heating and to pressure by the manipulation of the work-supporting or work-holding slide or carrier. The main object of this part of my invention is to provide a simple and readily-controllable means for reducing the bur or upset produced in the electric butt-welding operation and which shall be capable of being actuated or controlled at will, so that it may be made to act to any required extent and, if desired, while the welding pressure is maintained.

The invention consists also in the special combinations of devices for effecting the operation of the hammer or press and for securing other results, as more particularly hereinafter described. Preferably in electric welding the anvil and hammer or press are made with engaging surfaces in the form of dies of proper shape to give the desired finish to the work.

Another part of my invention relates to the mechanism or devices for actuating the work-holder to apply the welding or upsetting pressure and (in the special class of machine herein described) to effect a clamping of the work at the same time. This part of my invention consists in an improved combination of toggles and actuating-lever, whereby the workman may apply a heavy pressure to the work, as hereinafter described.

The invention relates, further, to the means for applying heating-current to the work by contact-electrodes brought into engagement with the same by movement in the lateral direction or transversely to the line of operation of the work-holders. The object of this part of my invention is to permit the application of a heavy heating-current to the work by side contact-electrodes and also to permit an adjustment of said contact-electrodes for wear as well as for varying the projection of the work, or, in other words, the extent of the heated section or portion of the work, by determining the position or point at which the contact-electrode supplies the heating-current. Broadly stated, this part of my invention consists in the combination, with the work-holders for an electric metal-working apparatus and their operating devices, of lateral contact-electrodes mounted upon suitable slides or carriers which are in connection with a stationary source of heating-current—such, for instance, as the secondary of a transformer. This part of my invention has to do, further, with the special construction and manner of mounting the contact-electrodes and their slides or carriers, and also to the general combination and disposition of the transformer and other portions of the apparatus comprising the work-holders and their operating mechanism.

A further object of the invention is to equalize or exactly determine the pressure with which the contact-electrodes shall engage the work and also to secure a uniformity of pressure contact when said electrodes are operated by a power which is liable to vary—as, for instance, by a treadle operated by the foot of the workman. This part of my invention consists, broadly, in the combination, with a pair of contact-electrodes adapted to engage the work laterally at opposite sides of the heated section, of an equalizing lever or link interposed between said contact-electrodes and the actuating power.

The invention further consists in the interposition of a spring between each or either of said contact-electrodes and the actuating power, as well as in other details of construction and combinations of parts.

The invention also relates to the means for actuating the controlling device for the apparatus or mechanism which automatically stops the flow of current through the work when the work-holder has been moved to a predetermined extent. This part of my invention consists, broadly, in the combination, with the work-holder or work-holding slide, of a controlling device connected therewith through motion-multiplying mechanism, so that a comparatively large movement of the controlling device will be produced by a small movement of the work-holder. This part of my invention is particularly useful in machines designed to operate on heavy work—as, for instance, heavy chain-links.

The invention relates also to the novel construction of replaceable and reversible hammer-die and in other details of construction and combinations of parts, as more particularly hereinafter described and claimed. When employed in connection with endless forms of metal of large cross-section and which in the welding processes are subjected to considerable flexure or bending in their cold portions, another object sought and attained is to eliminate certain internal stresses which would exist in and weaken the welded link if it were employed without first drawing out the bur or upset of the weld.

My invention has various other objects and features which can be most readily developed in the course of the following more specific description and which are fully disclosed therein.

The following description and the accompanying drawings, which illustrate it, relate specifically to only one form and construction in which my invention may be embodied; but it will of course be understood that by the application of technical knowledge and mechanical skill my invention in its broadest conception may be diversely modified and may be embodied in numerous structural forms without in any wise departing from or exceeding its present scope or spirit. It will also be apparent to those versed in the art that many of the specific features disclosed are in no wise essential to my invention in its broadest aspect, but may be dispensed with or modified in various of its particular applications and usages and still have an operative embodiment of my invention broadly.

For the purpose of illustrating my invention I have chosen to show and describe the same as embodied in a machine for welding the links of chains; but, as already stated, it is in many of its features applicable to other electric metal-working machines.

In the said drawings, Figure 1 is a plan of the table of a machine embodying my invention and shows part of the electric welding mechanism with a portion of a chain in position for welding one of its links. Part of the bur-removing or link-hammering mechanism is also shown; but the upper portion of that mechanism—that is, the hammer or upper hammer-die and its actuating parts—is removed from the table. Fig. 2 is an elevation of the machine from a viewpoint to the right of Fig. 1. The upper hammer mechanism is also removed from the table in Fig. 2. Fig. 3 is an elevation view looking from the left of Fig. 1 and shows the upper hammer mechanism in position upon the table. Fig. 4 is a front elevation of the entire machine. Fig. 5 is a rear elevation of the entire machine. Fig. 6 is a substantially central sectional elevation of most of the working elements of the machine looking from a position to the right of Fig. 1. The link holding or clamping mechanism and the upper hammer-die mechanism are not shown, and most of the framework is omitted for the sake of clearness. Fig. 7 is a plan of the upper portion of the machine containing a hammer-operating mechanism with the clutch-controlling lever by means of which the hammer-operating devices are coupled to the driving power. Fig. 7$^a$ shows in perspective the clutch-key that may be used as a part of the clutch mechanism. Fig. 7ᵇ is a transverse section through parts, showing the position of the clutch-key when the driving power is rotating freely; and Fig. 7ᶜ is a similar section showing the position of the clutch-key and parts when coupled. Fig. 7ᵈ illustrates the position of the control-arm and clutch-key when engaged with the clutch-controlling lever to permit the power to rotate freely, and Fig. 7ᵉ shows the same parts when the clutch-key arm is released so as to couple the hammer-actuating shaft to the driving power. Fig. 8 is a rear elevation of the transformer and the movable terminals or contact-carriers of its secondary circuit, showing the movable terminals 91 and 92 sectioned on the line $a\,a$ of Fig. 6 and showing the transformer-core 106 divided on its normal line of division $b\,b$, Fig. 6. The primary coil 111 and the current-controlling secondary coil 112 are omitted from this view. Fig. 9 is a detail plan of the right-hand link-holding die or work-holder 5. Fig. 10 is a sectional elevation of the right-hand link-holding die or work-holder 5 looking in front of the die and taken on the center line of the chain as indicated at $a\,a$, Fig. 9. Figs. 11, 12, and 13 are respectively a left-hand elevation, a rear elevation, and a plan view, of the sliding bracket or die-post for holding the lower hammer-die. Fig. 14 is a side elevation of the lower hammer-die; and Fig. 15 is a sectional end elevation thereof, taken on the line $a\,a$ of Fig. 14. Fig. 16 is a plan view of one of the upper roller-bearings proper for the movable terminals or contact-carriers of the secondary circuit. Fig. 17 is a diagram corresponding to a rear elevation and shows a convenient method of feeding the chain through the machine while its links are being welded. Fig. 17 also illustrates one operation of a special process of welding a chain characterized by a certain arrangement of previously-welded chain-links or stamped or drop-forged weldless links, together with links which are to be welded in the machine, as will be more fully explained hereinafter. Fig. 18 is a plan view and diagram illustrating the method of heating the contiguous ends of the link preparatory to welding and discloses a particular and important feature of the heating process, which depends upon a certain formation of the said contiguous ends. Fig. 19 shows the links after the weld has been made, but before the bur or upset has been drawn out by the hammer-dies. Fig. 20 shows the finished link. Fig. 21 shows in side elevation a modification in the form of a nose or engaging portion of the contact which passes current into the link laterally. Fig. 22 is a plan of a pair of contacts modified as indicated in Fig. 21.

The main frame of the machine comprises the bed-plate 113 and the right and left legs 124 and 125, respectively, mounted upon the bed-plate and supporting the table 114.

The particular form of machine illustrated is designed to weld together the ends of that form of link which is bent up or otherwise formed from a single piece of metal. In Fig. 18 this form of link (designated by 1) is shown in plan view on a comparatively large scale. The juncture which is to be welded is located in one side of the link midway between its ends.

The link or other object which is to be welded or otherwise worked is clamped longitudinally and in a horizontal plane between the left and right holding-dies 4 and 5, respectively, and with its open or broken side being toward the rear of the machine and facing the contact-electrodes or "contacts" 101 and 102, which by making contact with the work supply heating-current thereto. These work-holders or holding-dies are firmly bolted in suitable recesses conforming to their outline in the left and right horizontal die-slides or holding-die slides 26 and 22, respectively, mounted upon the table 114, near the front thereof, and adapted to slide horizontally in right and left directions toward and from each other. The left slide 26 is normally stationary. It is mounted between suitable guides 27 and 28, formed upon the table. It is longitudinally adjusted, and its extreme left-hand position is variably limited by the adjustable stop-screw 29, mounted in a suitable bracket 30 and abutting against the outer end of the slide.

The right horizontal die-slide 22 is mounted between suitable guides, such as 130, formed upon the table, and is held down by front and rear gibs 23 and 24, bolted upon its said guides. This is the movable one of the horizontal or holding-die slides or work-holders. It is actuated by a double toggle (or toggle-actuated toggle) comprising a secondary toggle, which moves the slide directly, and a primary toggle, which actuates the secondary toggle and which is actuated by a long hand-lever or clamping-lever 9.

The outer or fixed toggle-arm 18 of the secondary toggle is pivoted at its outer or extreme right end to the fixed stud 19, inserted in a suitable boss 139, formed on the table. The inner toggle-arm of the secondary toggle comprises a forked or slotted head 17, which receives the swinging end of the fixed toggle-arm 18 and comprises a slide end 126, screwed into the slotted head and pivoted to the right end of the movable holding-die slide by a stud 21. The fixed arm of the primary toggle is constituted in a block or casting 10, pivoted at one point to the fixed stud 13, inserted in the table, and at another point slotted to receive the rear end of its complementary toggle-arm 15, which is in the form of a simple flat link and is pivotally secured in the said slot by a pin 14 passing through it and the casting 10. The forward end of the arm 15 of the primary toggle is inserted in a slot in the swinging end of the fixed arm 18 of the secondary toggle, and a pivot-pin 16, passing through said forward end and the coöperating ends of both secondary toggle-arms, serves to pivotally unite the three ends. The casting 10 also constitutes the pivotal head for the hand-lever 9, which is bolted in a suitable recess or slot in the top of the casting. This right-hand-limit position of the movable horizontal slide 22 is variably determined by the adjustable stop-screw 20, which is mounted in a suitable lug or bracket 129 and engages the right end of the slide.

The work-holders or holding-dies 4 and 5 are right and left duplicates, and both are therefore clearly illustrated in Figs. 9 and 10, which show the right die 5. The dies are provided with shallow link-clamping recesses, such as $5^a$, in their upper surfaces and at their adjacent ends. Each of these link-clamping recesses conforms substantially to the plane outline of the end of the link, which it receives in position for welding. The dies are also provided with outer link-holding recesses, such as $5^c$, in their upper surfaces and extending from their outer ends toward the said link-clamping recesses. These outer link-holding recesses are slightly wider than the links which are to be welded and at their inner ends may also conform substantially to the outline of the chain-links. Each holding-die has a counter recess or channel, such as $5^b$, only slightly wider than the thickness of the chain-links and deeper than the clamping and holding recesses, which extends the entire length of the die. When the links which are to be welded are already interlinked in a chain, the outer link-holding recesses receive the horizontal links on either side of the link, which is clamped between the dies in position for welding, while the links of the chain which are disposed in a vertical plane are received by the long narrow counter-recesses. By means of this formation of the holding-dies a single movement of the clamping-lever 9, which brings the dies toward each other, not only serves to clamp the chain-link or other work which is to be welded or otherwise operated on (whether it be separate or linked in a chain) firmly between the dies and in their clamping recesses, but also accurately centers and locates the link in such position that its ends which are to be welded will be engaged by respective ones of the contact-electrodes 101 and 102 when the latter are moved forward on their respective contact-carriers 91 and 92, as will be fully explained hereinafter.

It is obvious that the actuating mechanism described is applicable to die or work holders of the usual form and in which the work is clamped by means independent of those employed in forcing one work-holder toward the other when the work between them has been heated to a suitable extent.

The contact-carriers 91 and 92 are supplied with current from any suitable source, the terminals of which are properly constructed to preserve connection with said carriers during the forward movement of the same to bring the contact-electrodes against the work. By preference I employ as a source of current a secondary of a transformer which may be of the type commonly employed in the art and which as shown comprises a copper casting 104, constituting a conducting-loop whose current-inducing portion $104^e$ passes through the rectangular opening in the rectangular transformer-core 106, and thereby makes a conducting-loop around the upper leg or side of the core. The plane of the loop or casting constituting the secondary of the transformer is parallel to the line of movement of the work-holding slides. Its loop is broken by a narrow gap and is formed with upwardly-projecting rectangular left and right terminal blocks $104^a$ and $104^b$, respectively, which extend through a rectangular opening in the table. The rear surfaces of these terminal blocks $104^a$ and $104^b$ are flush with the rear surface of the lower portion of the loop; but the forward ends of the blocks extend considerably in front of the lower portion of the loop in order to give the blocks ample length to bear and make contact with their respective contact carriers or slides 91 and 92. These terminal blocks $104^a$ $104^b$ are provided with suitable guides or ways adapted to permit contact-carriers to move in a line transverse to the plane of the loop or secondary and so as to bring the contact-electrodes sidewise against the work.

At each of its four corners and immediately beneath the table the casting 104 of the secondary circuit is provided with suitable lugs by means of which it is bolted to the under side of the table. The terminal blocks are insulated from each other by an insulating-plate 105, interposed between them, and the entire casting 104 is insulated from the table by suitable insulating-plates, bushings, and washers, as indicated.

In each of its opposing faces the secondary loop is provided with a loop-shaped slot or recess $104^d$, passing through the core-opening and around the upper leg of the core. In the front one of these recesses the front coil 110 of the primary circuit is embedded, while the rear recess similarly receives the rear coil 111 of the primary circuit and also the current-controlling secondary coil 112, disposed around the coil 111 and concentric therewith.

The coil 112 generates a current which may be used in the manner set forth in patent to Lemp and Anderson, No. 519,336, dated May 8, 1894, or in any other suitable way in connection with the devices that control the supply of current to the work.

The transformer-core is made in halves 106, separable at the center line $b$ $b$ of the secondary loop-casting. Each half is built up of laminæ bound together between end plates 107 by suitably-insulated bolts. By means of tie-bolts 108 passing through guide-holes in suitable lugs formed on the end plates the two halves of the core are bound together between two pairs of suitably-insulated binding-yokes 109, which horizontally cross the outer ends of the core. The core rests upon an insulating-plate on the bed 113 and is secured in place by insulated bolts passing through lugs horizontally extending from the lower edges of the end plates 107.

The upper surfaces of the terminal blocks 104$^a$ and 104$^b$ are provided with broad longitudinal guide-channels in which the lower roller-bearings of the contact-carriers are inserted and run longitudinally. The contact-carriers 91 and 92 are elongated blocks of copper provided on their under side with depending longitudinally-disposed ridges which project into and nicely fit the guide-channels of their respective terminal blocks and bear upon the roller-bearings lying in the channels.

The upper sides of the contact-carriers are provided with longitudinal guide-channels narrower than those of the terminal blocks and in which the upper roller-bearings of the contact-carriers are disposed. Above and upon these upper roller-bearings are mounted the upper bearing-plates 98. A carrier-stud 95, passing through each end of each of the upper bearing-plates, is inserted between the rollers of its respective upper roller-bearing through a longitudinal slot (such as 91$^a$) in its respective contact-carrier between the rollers of the lower bearing and into its corresponding terminal block, wherein it is firmly fixed. A sheet-metal bearing-spring 97 is slipped over the upper end of each stud and is caused to bear down upon its respective end of its corresponding upper bearing-plate by a nut fitting the upper end of the stud and screwed down upon the spring. By means of this organization each contact-carrier is mounted with roller-bearings between its respective terminal block and upper bearing-plate, whereby it may be moved longitudinally with negligible friction. The carrier-studs, their nuts, and the springs serve to hold the entire combination together, and the pressure of contact between the contact-carriers and their roller-bearings may be varied and adjusted by means of the nuts.

The upper and lower roller-bearings proper of the contact-carriers are the same in general construction and differ only in their overall dimensions and the number of rollers they employ. The arrangement is clearly illustrated in Fig. 16. The rollers 103 are mounted in a frame comprising two side bars 93 of oblong cross-section connected at their ends and middle by round cross-bars 94, riveted to the side bars. The rollers are pivotally mounted at either end by pins driven fixedly into the ends of the rollers, but turning freely in bearing-holes in the opposing side bars of the frame. It will be noted that the rollers are widely separated at two points in the bearing in order to clear the carrier-studs 95.

The left and right contact-electrodes 101 and 102 are mounted, respectively, upon the left and right contact-carriers. The contact-electrodes are elongated copper blocks of oblong cross-section and lie in a horizontal plane in nicely-fitting contact-guiding grooves or channels cut across the upper surfaces of the carriers at an angle to their longitudinal axes and extending from the outer sides of the carriers diagonally forward and inward toward each other and the work-holding clamp. Within these grooves the contact-electrodes are slidable convergingly toward each other and at the same time toward the front of the machine and the work, and the movement of each contact-electrode in an angular direction relative to its respective carrier is resolvable into two rectangular components, one of which is a forward-and-backward movement parallel to the movement of the carrier and the other of which is a lateral component or movement toward or from its opposite contact-electrode.

The positions of the contact-electrodes may be nicely varied and determined by the adjustment-screws 116, which bear upon the rear ends of the contacts and are supported in angularly-disposed depending lugs 99$^a$, hanging in the outer ends of the contact-electrode grooves and formed upon the oblong plates 99, which bridge the grooves and are bolted to the edges of the carriers.

The contact-electrodes are firmly clamped in place underneath rectangular clamping-plates 99, which clamping-plates are also partly inserted in the grooves and are held down by bolts 100 passing through them and through central longitudinal slots in the contacts and screwed into the bottoms of the contact-guiding grooves. The forward or contact end of each contact-electrode terminates in two normal vertical planes, one of which constitutes the contact-surface of the electrode. This surface is parallel with the portion of the link with which it is to make contact and is provided with a slight groove to receive the side of the link and increase the surface of the contact as well as to furnish a ledge or overhang which will prevent the work from rising from its position in the work-holders.

Each of the contact-carriers is provided with a stud 88, screwed into its rear end, secured by a lock-nut 90 and projecting horizontally backward. The rear ends of the studs pass through opposite ends of the pressure-equalizing lever or yoke 85 and are provided with yoke-retaining collars 86, pinned to the studs outside the yoke. The studs and their collars are insulated from the yoke by suitable bushings and washers, as indicated.

Equalizing compression-springs 87 are mounted on the studs and each is interposed between the yoke and a spring-nut 89, screwed upon its respective stud. At their ends adjacent to the yoke the springs bear upon steel washers mounted on their respective studs and insulated from the yoke by insulating-washers interposed between the yoke and the said steel washers.

The contact-carriers are actuated by a foot-treadle 75 or other means, forcing the equalizing yoke or lever toward the contact-carriers by a power supplied at the middle portion of the yoke. The foot end of the treadle projects in front of the machine near the floor, and the rear end is pivotally mounted upon a suitable shaft 76, which may be secured in a floor-bracket. (Not shown in the drawings.) The lower end of the vertical pull-rod 77 is pivoted between two upwardly-projecting lugs, such as 140, formed upon the foot-treadle. The upper end of the pull-rod is inserted and pivoted in a slot in the end of the forwardly-extending horizontal arm $78^a$ of the carrier-actuating bell-crank 78. The upper or vertical arm $78^b$ of the bell-crank is of circular or curved outline, is slotted, and is interposed between the rear face of the equalizing-yoke 85 and a washer placed under the head of the yoke-bolt 84, which passes through the slot and is screwed into the center of the yoke. The bell-crank is pivoted upon a pin 79 between two upwardly-extending lugs formed on the bell-crank bracket 80, secured to the table. This bracket is also provided with upper and lower guide-lugs $80^a$ and $80^b$, in which the vertical spring-plunger 81 is mounted. The carrier-retraction spring is a compression-spring 83, coiled upon the spring-plunger and interposed between the lower lug $80^b$ and a spring-collar 82, fixed upon the plunger, whereby the plunger is forced upward against the horizontal arm of the bell-crank, upon which the upper end of the plunger presses. This spring-pressure restores the bell-crank and retracts the carriers and their contact-electrodes after removal of the foot-pressure upon the treadle, which has brought the contact-electrodes into contact with the chain-link or other work. A stop-finger $79^c$, formed on the bell-crank, engages the bell-crank bracket and limits the retractive movement of the parts.

The double-ended lower hammer-die or anvil 7 is a flat oblong piece of hardened steel mounted with its working end underneath the clamping position of the link to be welded or other work and having its opposite or clamping end extending forward, the longitudinal axis of the die being disposed in a horizontal plane and at right angles to the center line of the chain-link and the flat sides of the die being vertical. The die is mounted in the holding-slot $8^a$ in the top of the vertical die-post 8. The outer or clamping portion $8^c$ of the top of the die-post is higher than the rear or inner portion, so that while the inner or working part of the die is inserted in a shallow slot which engages its sides only part way up the outer or clamping portion of the die is embedded in a deeper slot, the sides of which rise almost as high as the top of the die. The clamping-plate 118, which conforms in plane outline to the raised portion $8^c$ of the die-post, lies on top of the die and is provided with a bearing-ridge $118^a$, running along the left edge of its under side and bearing on the die-post.

A clamping-stud 119, inserted in the die-post on the left of its die-holding slot, projects up through the clamping-plate at a point between its bearing-ridge and the die, and a pair of nuts screwed over the clamping-stud and down upon the clamping-plate serve to hold the plate down upon the die and firmly clamp the latter in the die-holding slot in the die-post. Angular displacement of the clamping-plate is prevented by a pin $8^d$, inserted in the top of the die-post and projecting upward through the plate and on the side of the slot opposite the clamping-stud. Longitudinal displacement of the die is prevented by a dowel-pin $8^b$, inserted in the bottom of the die-holding slot and projecting upward into a central hole in the die.

The die is formed with interchangeable ends, so that when its working end becomes worn away or softened by contact with the heated chain-link, so as to be no longer fit for forming the link, the die may be turned around and its clamping end substituted for its working end. To effect this purpose, the top of the die is provided at either end with a semicircular bur-reducing or link-finishing die-recess $7^a$ and a semicircular clearance-recess $7^b$. Either end of the die is also provided with two opposite rectangular clearance-recesses $7^c$ in its opposite sides and underneath the semicircular clearance-recesses $7^b$. These rectangular recesses are designed to give clearance, with the holding or clamping dies 4 and 5 on either side of the lower hammer-die, when the latter is raised by its die-post so as to come between them and into operative contact with the welded chain-link. When the lower hammer-die is thus raised, the die-recess in its working end engages or receives the lower side of the welded half of the chain-link immediately at the point of weld where the undesirable bur has been formed, while the adjacent semicircular recess $7^b$ gives ample clearance between the lower hammer and the opposite half of the chain-link. It will of course be obvious that, if desired, the lower half of the lower hammer-die may be provided with recesses corresponding to those in its upper portion, the die being made symmetrical with respect to its longitudinal axis as well as relative to its transverse axis. Thus the die may be provided with four link-forming recesses, all of which may be available before the die is discarded or retempered.

The opposite forming-die 6, mounted directly above and coacting with the lower or supporting die 7, may be of any desired type and actuated and controlled in any desired manner. Preferably this opposite die is a hammer-die actuated by any suitable driving power and called into operation by a suitable controlling mechanism, such as a clutch, and of such character as to deliver one or more blows for each operation of the controlling device. The particular mechanism shown is of the character of the trip device which lifts the hammer or tool against a spring and then releases the same. These parts are mounted in a suitable frame comprising two substantially vertical and parallel webs 120, terminating in legs below and united above by two cross-bars 141 and 142, the former above the latter.

The upper hammer-die proper, 6, is fixedly secured to the lower end of the vertically-reciprocating die-shaft 69 by means of the knurled clamping-collar 74. The die-shaft is mounted in suitable upper and lower bearings upon the upper and lower cross-bars of the frame and is maintained in fixed angular position by any suitable guiding device.

The hammer or die 6 is a piece of round hardened steel flattened on either side and preferably provided with a bur-removing or link-finishing die-recess in its lower end. The die-shaft is so centered that in its lowest position the die-recess engages and fits around that portion of the chain-link which has been welded and upon which the welding-bur exists.

A stop-shoulder is provided on the shaft above the lower bearing, as shown at 71, so as to engage the bearing and limit the downward stroke of the shaft and its die in case they drop, through any inadvertence, before the chain-link and lower hammer-die are in proper positions to receive the impact.

As a means for operating the hammer and controlling its action the devices to be now described may be employed and so organized that when coupled to a suitable actuating power the hammer will automatically deliver one or more blows and then the power will automatically uncouple itself. While I prefer to employ a hammer and actuating mechanism of this character, so that by the simple movement of the controlling-lever the hammer may be caused to deliver one or more blows, I do not claim such mechanism as my invention; nor do I desire to limit myself to the employment of a clutch for controlling the application of power to the hammer, since, as will be obvious, other operating powers and other controlling devices might be employed. In the particular form of apparatus shown the vertical reciprocating shaft carrying the upper die 6 is provided with a raising shoulder or projection 62, as shown in the dotted lines, Fig. 3, which shoulder or projection is engaged by one or more actuating cams or dogs 58, mounted upon the cam-shaft 59, turning its suitable bearings in the opposite posts or uprights 120. This cam-shaft 59 is normally stationary in such position that the projection or cam 58 will hold the vertical shoulder lifted to a greater or less height against the pressure of the impact-spring 70, interposed between a collar or shoulder on the vertical hammer or die-shaft 69 and an upper cross-bar 141 of the frame.

A fly-wheel 122, driven by a belt in the left-hand direction, (looking at the left of the machine,) normally runs freely on the left end of the cam-shaft 59. It may be locked to the cam-shaft 59 at will by means of a clutch controlled by the horizontally-disposed elbow-lever 63, pivotally mounted upon a stud or projection 61 on the outside of the left frame-web 120. The function of the clutch in the organization claimed by me is simply to control the operation of the hammer by throwing into action the power which operates the same, and said clutch is to be taken as typical of any power-controlling device whose nature or character would of course vary with the power employed. It is also to be understood that while I have described the use of an upper forming-die which acts by impact I do not limit myself to the manner of actuating said die, since it is obvious that it might be, as well understood in the art, so operated as to apply pressure instead of impact.

The particular form of clutch device herein shown comprises a clutch-key 123. (Shown in detail in Fig. 7ª.) This key is of cylindrical form at its opposite ends to adapt it to be mounted and to turn freely in bearings formed, respectively, in a collar 121, keyed or suitably secured to rotate with the cam-shaft 59 in the head or cap 121ª on the outer end of said shaft. The intermediate portion of said key is cut away, as shown, and such cut-away portion is located in the hub 122ª of the wheel 122. In the inside of the hub next the shaft 59 is a key-groove 55, in which the key is adapted to turn. When the clutch-key stands in the position shown in Fig. 7ᵇ, which is a cross-section through the fly-wheel hub and shaft 59, it is obvious that the wheel and hub 122ª may run loose, but that by turning the clutch-key, so as to bring it into position shown in Fig. 7ᶜ, said wheel and hub will be locked to the shaft 59, and the latter will be rotated by the power applied to the wheel 122. The clutch-key 123 is provided with a controlling-arm 123ª, against the inside of which presses a spring 56, confined between said arm and the pin 57, secured to the inside of the hub or collar 121. Said spring tends to turn the clutch-pin into the position shown in Fig. 7ᵉ, which is the position in which the parts will be coupled, as shown in Fig. 7ᶜ. The clutch is normally held in position as shown in Fig. 7$^d$, which is the position in which the parts are uncoupled, as shown in Fig. 7$^b$, by the engagement of said arm with the toe or projecting arm of the clutch-control lever 63 when in position shown in Fig. 7 and Fig. 7$^d$. This position of the parts is maintained by the friction between the rotating and stationary members of the clutch. When the clutch-control arm 63 is turned to one side to free the arm 123$^a$ of the clutch-key, said clutch-key turns to the position shown in Fig. 7$^c$ as soon as the key-groove 55 in the hub of the rotating member comes around to coincidence with the clutch-key, and the parts become locked, so as to turn together in the relation shown in Fig. 7$^c$, and because the spring 56 turns the clutch-key in its bearings.

So long as the clutch-control lever remains turned to one side to be out of the path of the clutch-key arm the cam-shaft 59 will rotate and operate the hammer in the usual manner; but when the clutch-control lever 63 is permitted to turn back to the position shown in Fig. 7 the clutch-arm by engaging said lever will turn the clutch-key to position shown in Figs. 7$^b$ and 7$^d$, so as to uncouple the driving power.

It is obvious that in the place of the form of clutch device just described any other form may be used which will effect the same operation.

The bur-reducing or link-finishing operations of both the upper and lower hammer-dies are controlled by a single hand-operated lever 31, which may be therefore designated as the "finishing-lever." It is a long lever pivoted at one end by a stud 41 to a bracket secured to the rear of the left leg 125 of the frame. The lever extends forward across the left side of the machine and to a distance considerably in front thereof, where it is furnished with a suitable handle. A simple vertical link 33 is pivoted at its upper end to the finishing-lever by a pin 32 near its handle. The lower end of this link is pivoted in a slot in the swinging end of the rocker-arm 35, fixedly mounted on the outer or left-hand end of the rock-shaft 36, whose inner end is mounted in the vertical walls of the guide-bracket 136 of the lower hammer-die slide 38. This bracket is mounted upon the bed, and between its said walls the cam 37 is fixedly mounted on the rock-shaft.

Above the rocker-cam 37 and resting upon it is the lower hammer-die slide 38, provided with vertical guide-ribs 38$^a$, projecting from its opposite sides and sliding in suitable guide-grooves in the opposing vertical walls of the slide-bracket. The slide is held in place by gibs 143 overlapping its guide-ribs and bolted to respective walls of the bracket. Upon the upper end of the slide the die-post 8 of the lower hammer-die is mounted and secured by a bolt. A spring-lug 38$^b$ projects rearward from the lower end of the slide and rigidly supports the lower end of the vertical spring-stud 39, the upper end of which passes freely through a hole in a spring-lug 136$^a$, formed on the guide-bracket. A compression-spring 40, coiled around the spring-stud and interposed between the spring-lugs, forces the slide always down upon the rocker-cam.

The rocker-cam 37 is provided with radially-extending stop portions 37$^b$ and 37$^c$, which engage a common stop-pin located between them and mounted in the vertical walls of the guide-bracket. The angular movements of the rocker-cam, its rock-shaft, and the finishing-lever 31, connected therewith, are thereby limited.

To operate the power-controlling device, such as the clutch already described or any other device having a similar function, as already set forth, the following devices connected with the finishing-lever or other means which operate the cam 37 or device for lifting the lower die may be employed. Preferably these devices embody a trip pawl or dog of such nature that it will engage or lock in one movement of the parts, but will move freely in the opposite movement of the parts. An upwardly-projecting pawl-bracket 42, secured on the outside of the finishing-lever 31 near its rear or pivoted end, carries at its upper end a pawl 46, mounted on a stud 43, inserted in the inner face of the bracket. The pawl has a pawl-tooth 46$^a$ projecting radially from its upper side and a radial stop projection 46$^b$ projecting from its lower side and engaging the stop-screw 45, inserted in the pawl-bracket below the pawl. The pawl has a short hub or boss lying against the pawl-bracket. A circular wire spring 44 is coiled around this boss and has one end anchored to the stop-pin 45, while its other end is inserted in the stop projection 46$^b$ and tends always to turn the pawl, so as to bring the stop projection against the stop-pin. Immediately above the pawl a trip-collar 47 is fixed upon the outer end of the horizontal rock-shaft 48, mounted in a suitable bracket 135, bolted on the table. The trip-collar is provided with a radially-depending trip-tooth 47$^a$ in position to make engagement with the pawl-tooth 46$^a$ of the pawl when the latter passes through its arc of motion about the finishing-lever pivot 41 as an axis. Upon the end of the rock-shaft 48, opposite the trip-collar, is fixed a horizontal rearwardly-extending rocker-arm 49, slotted at its swinging end. A vertical connecting-link 51, including an adjustable turnbuckle, has its lower end pivoted in the slot in the rocker-arm 49 and its upper end pivoted in a similar slot in the horizontal arm of an elbow-lever 53, whose vertical arm connects by a link with the clutch-controlling lever 63, which elbow-lever 53 is provided with a retractable spring 57$^a$, as shown in Fig. 3.

During a first part of the angular movement of the finishing-lever its slide-raising portion 37ᵃ raises the vertical die-slide 38, together with the die-post 8 and its lower hammer-die 7, until the latter comes into operative contact with the link or other work which is to be finished. The rocker-cam and the bottom of the die-slide resting upon it are so formed that this operative position of the lower hammer-die is immovably maintained during the latter part of the said movement of the cam and finishing-lever. During such latter part of the finishing-lever's downward movement, and hence after the lower or supporting hammer-die has been brought into operative engagement with the chain-link to be finished, the pawl-tooth on the pawl 43 engages the trip-tooth on the trip-collar 47 and forcibly turns the latter and its rock-shaft 48 so as to depress the swinging end of the rocker-arm 49, pull down on the link 51, and through the intermediate devices turn the clutch-control lever 63, thereby permitting the clutch-key to couple the driving power to the cam-shaft 59. This causes the hammer-die to deliver one or more sharp and rapidly successive forming or drawing blows upon the burred or upset portion of the chain-link while it is still hot and plastic as a result of the welding heat, as will be more fully explained hereinafter. It will be noted that the precedence of the operation of raising the lower or supporting finishing-die over the operation of starting the opposite die insures the chain-link against being engaged by the latter die before the supporting-die is in position to sustain and react against the impact or pressure. This provision is of course very necessary, since such a premature unsupported action of the die would bend the link out of form, but would not reduce its bur. Immediately after engaging the trip-collar and actuating the clutch-controlling lever to start the raising-cam 58 the pawl 46, carried still farther forward by the continued downward movement of the finishing-lever, passes beyond position of engagement with the trip-collar and releases the latter, whereupon the retractile tension-spring 57ᵃ restores the clutch-controlling lever 63 to its normal position, in which its arm will be engaged by the arm of the clutch-key and stop the rotation of the cam-shaft and its raising-cam. Obviously the replacing of the clutch-controlling lever and elbow-lever 53 to normal position also restores the rock-shaft 48 and its trip-collar in the proper angular positions to be again actuated by the pawl in its forward movement. During the return or upward movement of the finishing-lever the lower hammer-die slide 38 is of course depressed with its die-post and die, while the clutch-actuating pall 46 moves backward. During such backward movement of the pawl its pawl-tooth is engaged by the trip-tooth 47ᵃ and is placed downward, so as to pass underneath the latter, while the pawl-spring 44 yields and permits the pawl to turn upon its pivot to accommodate the action. Such return movement of the finishing-lever and its connected parts is effected by a long retractive tension-spring 115, stretched between an anchor-pin 138, inserted in the left leg of the frame near its rear edge, and the outer end of a spring-pin 137, inserted radially in the hub of the rocker-arm 35, linked to the finishing-lever.

Upon the rear end of the casting 10, constituting the pivotal end of the clamping-lever 9, or otherwise connected with said lever or the primary toggle is the controlling device which governs the action of the cut-off devices which stop the flow of the heating-current through the work when the work-holder has been moved to a predetermined extent. Such controlling device may be of the character or operate upon the general principle described in prior patents, among which may be cited United States Letters Patent to E. Thomson, No. 385,022, dated June 26, 1888.

For the purpose of exemplifying my present invention I have shown said controlling device as an electric circuit closer or breaker, here shown, however, as a circuit-closer comprising a contact-spring 11 and a coöperating contact-pin mounted on a suitable post 134, fixed upon the table, but preferably insulated therefrom. The contact-spring is so mounted upon the parts that when the work-holder is moved in a direction to clamp the work and apply pressure to the same said contact-spring will make contact with the pin, and thereby close a circuit which calls into action the devices for cutting off the flow of current, as described in patent to Lemp and Anderson, No. 519,336, already referred to. It will be understood, however, that said electrical contact might operate through the intervention of other circuits and devices to cause the flow of heating-current to cease when the work-holder has moved to a predetermined extent.

The contact-pin mounted in post 134 is adjustable, so as to vary at will the amount of movement of the clamping-lever and work-holder which shall be required to effect the contact. The contact-pin may be secured in any position by means of the set-screw 134ᵃ, bearing upon it and inserted in the top of the post. These parts constitute an adjustable switch for automatically controlling the welding-current in the chain-link. By a circuit not shown on the drawings the switch is included in series with the current-controlling coil 112 and the actuating-coil of an electromagnetic circuit-breaker controlling the primary circuit which feeds the primary coils 110 and 111 of the transformer. This circuit-breaker and the said primary circuit are also omitted from the drawings, since their arrangement is well known to the art. When the automatic current-controlling switch closes the circuit of the current-controlling coil 112 through the actuating-magnet of the circuit-breaker, the latter opens the primary circuit, and thus stops the flow of the welding-current.

The link and its ends which are to be welded together are so formed, Fig. 18, that the ends touch (or by application of end pressure on the link may be made to touch) at their inner sides $1^d$, while a small gap $1^e$ remains between their outer sides. In Fig. 18 this gap is much exaggerated. It need only be sufficient to prevent conductive contact between the ends at their outer sides. The link is placed, centered, and clamped between the holding-dies 4 and 5, as before described. If its inner ends do not touch, they may be brought into conductive contact by a slightly-increased pressure on the clamping-lever. The contact-electrodes are then brought forward by a downward pressure on the foot-treadle until they make contact with the side of the link which is to be welded and on either side of the juncture and preferably equidistant therefrom. The primary circuit is closed, thus inducing a current in the secondary circuit or loop of which the contact-electrodes are the active terminals. The secondary current passes, as indicated by broken lines, from one contact-electrode to the other through the link and through the inner contact $1^d$ of its contiguous ends. Meanwhile the operator maintains an end pressure of the holding-dies on the link by means of the clamping-lever 9. Since the contact is the greatest resistance in the circuit, the link at this point is rapidly heated by the current until it becomes soft and plastic and yields and spreads under the longitudinal or end pressure to which the abutting surfaces are subjected. As the contact-surfaces thus yield, the operator gradually but quickly brings the holding-dies closer and closer together, thus gradually but quickly bringing more and more surface of the link ends into conductive contact, while the heat gradually but rapidly spreads toward the outer side of the juncture. This operation continued quickly brings into contact, heats, welds, and spreads or upsets the entire cross-section of the abutting link ends, thus completing the welding of the link. The foregoing method of heating is found necessary, because in practice if the abutting link ends touch initially throughout their entire opposing surfaces or at the outer side thereof the heat is developed at the outer side of the contact first, and the inner side thereof cannot be sufficiently heated without concurrently heating the outer side to an excessive and prohibitive degree. This is due to the fact that when the abutting link ends touch throughout their entire adjacent surfaces the circuit of least resistance and inductance from one contact-electrode to the other is through the outer side of the abutting link ends and the outer side of their contact, which side is next the contact-electrodes. As a result the heating-current is concentrated in such outer side. This effect is even greater with the alternating current generally used in electric welding than with a direct current, since at high frequencies the inductive resistance or inductance adds greatly to the total impedance of the circuit through the inner side of the link. If the link to be welded is of iron, the displacement of heating-current and heating effect is rendered still greater by the greater inductance of the inside circuit through the magnetic medium and by the fact that the permeability or magnetic susceptibility of the outer side of the abutting link ends and their contacts is greatly reduced by their increase in temperature, thereby still further reducing the inductance of the outer side of the circuit.

As the clamping-lever reaches the position corresponding to the completion of the weld the automatic current-controlling switch causes the circuit-breaker to operate and terminates the welding-current, as before explained, the link having assumed the form shown in exaggerated degree in Fig. 19. The outer side $1^f$ of the link being too cold to be upset by the end pressure of the holding-dies is compelled to bend in order to accommodate the lateral upsetting and concurrent longitudinal contraction of its opposite side. It is obvious that this flexure or bending of the cold side of the link would develop a tension in the welded side which would open the juncture if the end pressure of the dies were relieved while the weld was still hot and soft. It is further obvious that if the link were allowed to cool and were used in this condition the internal stresses developed by the welding strain would still exist and would weaken the link. To avoid both these contingencies, as well as to accomplish the fundamental object of drawing out the upset itself, the following series of operations is enacted.

The end pressure of the holding-dies is maintained by the operator, and the foot-pressure on the treadle is relieved, permitting the contact-electrodes to be retracted. The finishing-lever is then pressed downward, raising the lower hammer-die into operative engagement with the upset portion of the chain-link and starting the upper hammer-die, which strikes one or more blows upon the burred or upset portion while it is still hot and soft, thus hammering down the bur and drawing off the upset, restoring the welded side of the link to normal length and diameter, and nicely rounding it in the concave surfaces of the dies. Meanwhile of course the end pressure of the holding-dies may be gradually relieved to accommodate the consequent elongation of the link, which is finished in perfect form, as illustrated in Fig. 20. Obviously by such straightening out of both sides of the link the internal stress before referred to is eliminated.

After welding and drawing the link as set forth in the foregoing the finishing-lever may be permitted to return to its upper position, thus depressing the lower hammer-die, the holding-dies may be separated, the finished link removed, and the operations repeated on the next link.

In Fig. 6 both the lower hammer-die and the contact-electrodes are shown in positions of operative engagement with the chain-link; but in practice these parts will not occupy such positions simultaneously, the electrodes being ordinarily retracted before the die is raised and the die being necessarily dropped before the welding-current is applied in order to avoid short-circuiting the contact-electrodes and the contact between the link ends, heating of the die, &c.

It will be noted that the double toggle which actuates the right holding-die slide from the clamping-lever not only effects a very large leverage in the lever relative to the slide and its die, but also constitutes a motion-multiplying device, which provides for a very large ratio of motion in the lever relative to the movement of the die. This condition not only enables the operator to exert a great end pressure of the die upon the chain-link with but little effort, but it also enables him to nicely vary and determine the position of the die during the welding and upsetting and drawing operations, even though its total displacement be very small, as it may be when very heavy links are welded. This large relative amplitude of motion in the clamping-lever also permits an ample separation of the current-controlling contacts up to the instant of their engagement and enables such instant of contact (relative to the movement of the die) to be nicely varied and determined by shifting the position of the contact-pin 12 no matter how small the actual movement of the die may be.

As the foot-treadle is pressed downward, causing the carrier-actuating bell-crank to move the equalizing-yoke of the carriers forward, the equalizing-springs transmit the motion to the carriers, and they are moved forward with the yoke until their respective contact-electrodes engage the slides of the chain-link. During the remaining portion of the yoke's forward movement the equalizing-springs are compressed as the yoke, with its insulating-bushings, slides freely over the spring-studs. The interposition of the equalizing-springs in lieu of a rigid connection between the yoke and the carriers insures firm contact between the chain-link or other work and each contact-electrode, even though one should engage the link before the other, as may happen when the link is not perfectly symmetrical or when the contact-electrodes are slightly out of proper relative adjustment.

Another object of the springs is to provide a yielding and following contact between the electrodes and the link which will accommodate all lateral movements of the latter (such as its spreading and upsetting) during the heating and welding process. The pressure of these springs may be varied by means of the spring-nuts 89.

In electric-welding operations of the character described the heating effect of the current depends largely upon the distances of the contact-electrodes from the abutting ends of their respectively contiguous members which are to be welded. These distances are termed the "projections." They should generally be equal, but must be varied with varying sizes and conditions of the work to be handled. It will be noted that by means of the adjusting-screws 116 and the lateral components of the movements of the contact-electrodes in their respective guide-channels of the carriers their projections may be varied at will and may be made equal or unequal in varying ratio. Similarly, by means of the forward and backward components of the movements of the contact-electrodes in their guide-channels they may be adjusted to make up for reduction of their contact-surfaces by wear and burning.

Another method of varying the ratio of the projections of the abutting ends of the link consists in varying the limit position of the left-hand holding-die as determined by the adjustable stop-screw 29, thereby shifting the point of juncture in the link to any desired distance either side of the midway point between the contact-electrodes. Such shifting of the left-hand die may also serve to equalize the projections when they are differentiated by unequal wearing of the contact-electrodes.

It will be noted that the general secondary circuit is very massive. This is required by the essential nature of the welding-current, which is of low voltage and great quantitive intensity. Such massive and unwieldy conductors are those necessarily constituting the general secondary circuit and are not directly applicable to such small work as the links of ordinary chains; but the contact-electrodes which my invention provides in the form of comparatively small conductors slidably mounted upon the large conductors of the secondary circuit constitute a contraction or concentration of the generally massive secondary circuit, in which the welding-current may be concentrated and readily applied to the work.

The form of the contact end of each contact-electrode may obviously be considerably varied. While it is shown in Fig. 6 as of such shape as to make lateral contact with the link on the side thereof, it might be formed as shown in Figs. 21 and 22, so as to make contact on the top and bottom of the link.

The term "side contact" is herein used, however, in the broadest sense to mean the contact "on a side situated laterally to the longitudinal axis," and to therefore include the contact made on the upper or on the bottom side thereof.

When the links to be welded are formed into a chain before welding, the alternate links will of course be disposed in planes normal to each other and all the links in one plane will have their open junctures on one side of the chain. The chain thus formed may then be run over two chain-pulleys 2, arranged on opposite sides of the machine, as indicated in Fig. 17, so that the stretch of chain between the two pulleys comes in proper lateral position to enter the holding-dies, as shown also in Fig. 1. The chain must of course be hung with the open sides of its horizontal links 1 disposed toward the contact-electrodes. It may then be fed through the holding-dies and over the pulleys by hand while its successive horizontal links are welded and finished. The chain may then be similarly fed through the machine again with its other set of links disposed in the horizontal plane in order to be welded. Fig. 17 represents this second part of the process, the vertical links $1^b$ having been already welded. When the links are thus welded, after being joined into a chain, the stop-screw 20 prevents the right-hand die-slide and its holding-die from being withdrawn by an inadvertent swing of the clamping-lever far enough to exert a tension on the chain held between the two dies, which tension might strain the links or break a new weld before it shall have cooled and hardened.

Fig. 17 also represents a modification of the foregoing chain-welding process which consists in welding a set of links 1, interlinked alternately with a set of links $1^b$ completely formed before such interlinking, either by previous welding in the machine separately or by drop-forging, stamping, or other suitable process.

It will be apparent that my invention may be applied to the making of lap and scarf welds as well as butt-welds.

I do not claim herein the improved electric welding process for welding links or other endless forms by welding one side of the link and drawing out the welded side to remove the stress developed in the bended side, nor do I claim that improvement which consists in initially abutting the pieces to be welded at one edge while conducting heated current into them at the opposite side thereof, nor do I claim herein the improvement which consists in bringing the two ends of the link or ring into abutment and hammering or condensing the joint while the welding pressure is maintained as herein set forth, since these improvements form the subject of claims in another application for patent filed by me as a division of the present application.

I claim—

1. In an electric metal-working apparatus, a work-holder adapted by the conformation of its work engaging surfaces to locate the work and effect the clamping of the same by the longitudinal movement of the work-holder in the operation of applying pressure to the heated section of work.

2. In an electrical metal-working apparatus, a work-holder adapted by the conformation of its work-engaging surfaces to locate the work and effect a clamping of the same by the welding or upsetting pressure in combination with a contact-electrode furnishing heating-current and means for bringing the same by a lateral motion against the work while the same is in the work-holder.

3. In an electric metal-working apparatus, a pair of work-holders adapted by the conformation of their work-engaging surfaces to locate the work and effect a clamping of the same by the motion of one of said work-holders toward the other.

4. In an electric metal-working apparatus, the combination with a pair of work-holders adapted by the conformation of their work-engaging surfaces to locate the work and effect a clamping of the same by the movement of one toward the other in applying the welding pressure, in combination with a pair of contact-electrodes adapted to engage the work laterally at opposite sides of the heated section.

5. In an electric chain-welder, a work-holder or holding-die adapted by the conformation of its link-receiving surfaces to locate the link and to effect the clamping of the same by a motion of said work-holder toward the work-holder at the opposite side of the section of link to be heated.

6. In a chain-welding apparatus, a pair of link-holding dies adapted by the conformation of their link receiving or engaging surfaces to locate the link and effect a clamping of the same by the motion of one of said dies toward the other in a direction to weld the section of link to be heated.

7. In a chain-welding machine, a link-receiving die or work-holder having a recess in its end next the section of link to be welded conforming substantially to the plane outline of the end of the link received therein in position for welding.

8. In a chain-welding apparatus, a link-receiving die or work-holder provided with an inner link-holding recess next the section of link to be welded and an outer link-holding recess to receive the next link to be welded.

9. In an electric chain-welding machine, a pair of link-holding dies having link-holding recesses in their adjacent ends conforming to the link to be welded and outer link-holding recesses joined with the inner recess by a counter recess or channel adapted to receive the connecting-link disposed in a plane transverse to the links resting respectively in said outer and inner recesses.

10. In an electric welding apparatus, a pair of dies or work-holders adapted to receive and support an endless metal form one side of which is to be welded and by the conformation of their work-engaging surfaces adapted to effect a clamping of the work by the movement of one of said dies or work-holders toward the die at the opposite side of the heated section.

11. In an electric welding apparatus, a pair of dies or work-holders adapted to receive and support an endless metal form one side of which is to be welded, and by the conformation of their work-engaging surfaces adapted to effect a clamping of the work by the movement of one of said dies or work-holders toward the die at the opposite side of the heated section, and a pair of contact-electrodes adapted to engage the work at opposite sides of the section to be heated.

12. In an electric metal-working apparatus, a work-receiving die or holder having in the line of welding pressure two work-receiving recesses joined by a counter recess or channel of greater depth but less width, as and for the purpose described.

13. In an electric metal-working apparatus, the combination with work-holders, of a pair of finishing-dies suitably mounted on the machine to engage the work between the work-holders and means for bringing one of said dies into engagement with the work to support the same, an operating handle or lever therefor, a power-controlling device controlling the application of the power by which the opposite die is actuated, and means controlled by said lever for bringing said power-controlling device into action to cause the finishing-die actuated by said power to engage the work after the supporting-die has been brought into engagement with it.

14. In an electric metal-working apparatus, the combination with the work-supporting finishing-die, of a rock-shaft, a finishing-lever connected therewith, and a cam on the rock-shaft adapted to raise and support said finishing-die in position between the work-holders of the machine.

15. In an electric metal-working apparatus, the combination substantially as described of the lower finishing and supporting die, an upper or opposite finishing-die, means for actuating the same, a power-controlling device and a finishing-lever common to said dies and connected with devices adapted as described to bring the supporting-die against the work and then to cause the finishing-die to act on the same.

16. In an electric metal-working apparatus, the combination substantially as described, of a lower hammer-die, a cam for raising and supporting the same, an actuating-lever for said cam, an upper hammer-die, and a power-controlling device also connected with said lever.

17. In an electric metal-working apparatus, the combination substantially as described, of a work-supporting finishing-die adjustable laterally into and out of the space between the work-holders, a rock-shaft adapted to fixedly support said die, an actuating-lever connected to said rock-shaft, an opposite finishing-die and a power-controlling device for the latter also connected to said lever.

18. The combination with an electric metal-working apparatus, of a lower hammer-die mounted on a suitable slide vertically adjustable, a rock-shaft and cam thereon adapted to support said slide and die in contact with the work, actuating devices for operating said cam, an opposite finishing-die and power-controlling devices connected with the actuating devices for the lower or supporting die.

19. The combination substantially as described in an electric metal-working machine, of a lower hammer-die mounted on a vertically-adjustable slide, a cam adapted to removably support said die, an upper hammer-die, means for actuating the same to cause it to deliver one or more blows, a power-controlling device therefor and means common to said power-controlling device and to the cam for first bringing the cam into position to cause the die to support the work and then causing the hammer-die to act on the same.

20. In an electric metal-working apparatus, the combination with the work-holder, of two interconnecting toggles one of which is directly connected with the work-holder slide and the other of which is connected with an actuating device.

21. In an electric metal-working apparatus, the combination with the movable work-holder, of a secondary toggle one member of which is joined to said work-holder, and a primary toggle whose movable member is joined to said secondary toggle while its fixed member carries an actuating-lever.

22. In an electric metal-working apparatus, the combination with the movable die-slide or work-holder, of an actuating hand-lever, a pivoted block or casting secured thereto and having an arm constituting one member of a toggle, a secondary toggle connected with the movable die-slide or work-holder, and a toggle-link pivotally connecting said secondary toggle with the pivoted block or casting carrying the actuating-lever.

23. In an electric metal-working machine, the combination with a die or work-holder adapted by the conformation of its work-engaging surfaces to locate the work and effect a clamping of the same when the said die-holder is moved toward the opposite die-holder, of an actuating hand-lever and intermediate mechanism between the same and the movable die-holder adapted to multiply the pressure.

24. In an electric metal-working apparatus, the combination with the movable work-holder, of a secondary actuating-toggle the outer arm or member of which is pivoted on a fixed stud secured to the work-table while its inner member is connected to the work-holder, a forked or slotted head for said inner member, a primary toggle having a link pivotally mounted in said head and a fixed member for said primary toggle pivotally mounted on the table and provided with a hand-lever.

25. In an electric metal-working apparatus, the combination with work-holders and means for forcing one toward the other, of a transformer the plane of whose secondary is parallel to the line of pressure and terminal blocks for said secondary provided with guideways whose axes are transverse to the plane of the secondary and to the line in which the work-holder slides or moves.

26. In an electric metal-working apparatus, a transformer having a secondary block or casting provided with recesses in opposite faces, adapted to receive generating-coils and with a terminal block having a guideway whose longitudinal axis is transverse to the axis of said coils.

27. In an electric metal-working apparatus, a transformer whose secondary terminates in two blocks each provided with a contact-carrying slide in combination with independent means for holding the work.

28. In an electric metal-working apparatus, a transformer whose secondary terminates in blocks or castings each provided with guides whose axes are transverse to the plane of the secondary, in combination with contact-carriers guided on said blocks, as and for the purpose described.

29. In an electric metal-working apparatus, a current-carrying block or slide, mounted and guided on a current-conducting terminal and adjustable thereon to and from the work, in combination with a contact-electrode adapted to furnish heating-current to the work by contact therewith, and itself adjustable on said block or slide at an angle to the line of movement thereof.

30. In an electric metal-working apparatus, a contact-electrode adapted to furnish heating-current to the work, by contact therewith, and adjustable on a movable support in a guide groove or channel at an angle to the line of movement of the support to permit the "projection" of the work to be varied.

31. In an electric metal-working apparatus, the combination with a pair of work-holders one or both of which are movable, of a pair of contact-electrodes, and means for moving the same transversely to the line of movement of the work-holders, each of said contact-electrodes being adjustable on its support diagonally to its line of movement.

32. In an electric metal-working apparatus, the combination with a pair of work-holders, of a pair of contact-carrying slides or blocks and contact-electrodes thereon, adapted to furnish heating-current to the work by surface contact therewith, and adjustable on converging lines as and for the purpose described.

33. In an electric metal-working apparatus, the combination of work-holders and independently-mounted contact-carriers adjustable to and from the work, and each provided with a contact-electrode adapted to supply current to the work by contact therewith, and adjustable on the carrier to vary the projection or extent of heated section of the work.

34. In an electric metal-working apparatus, the combination with a work-holder, of an independently-mounted contact-electrode adapted to supply current to the work by contact therewith, and mounted on a support adjustable transversely to the line of movement of the work-holder and means for adjusting the contact-electrode on its support to vary the projection of the work.

35. In an electric metal-working apparatus, the combination with a contact-carrying slide adjustable laterally with relation to the work in the work-holders, of a contact-electrode adjustable on said slide or carrier to compensate for reduction of the contact-surface by wear or burning.

36. In an electric metal-working apparatus, the combination with a work-holder, of a pair of independently-mounted laterally-engaging contact-electrodes and means for longitudinally adjusting the position of said work-holder to vary the ratio of the projection of the abutting ends of the work.

37. In an electric metal-working apparatus, the combination with work-holders, of a fixed transformer and contact-carriers slidably mounted on the terminals of said transformer in a line transverse to the line of movement of the work-holder.

38. In an electric metal-working apparatus, the combination with work-holders adjustable toward one another, of a transformer and a contact carrier or carriers adjustably mounted on the terminal or terminals of said transformer secondary and in a lateral direction with respect to the line of movement of the work-holder.

39. In an electric metal-working apparatus, the combination with work-holders and means for adjusting them toward one another, of a transformer and a contact carrier or carriers adjustably mounted on the terminal or terminals of said transformer secondary and in a lateral direction with respect to the line of movement of the work-holder and provided with contact-electrodes adjustably mounted as and for the purpose described.

40. In an electric metal-working apparatus, a pair of work-holders adjustable to and from one another and having link-clamping recesses in their upper surfaces and at their adjacent ends formed as described to clamp the link by a movement of one holder toward the other.

41. In an electric metal-working apparatus, the combination with a transformer secondary, of a contact-carrying slide movable on the terminal thereof, and a contact-electrode adjustably mounted in a groove or slide whose axis forms an angle with the axis of movement of said slide.

42. In an electric metal-working apparatus, a contact-electrode laterally movable against the work and having a ledge or overhang adapted to hold the work down in the work-holder.

43. In an electric metal-working apparatus, the combination with the work-holders, of an independently-mounted current-bearing contact transversely adjustable into and out of contact with the work and having an overhanging contact-surface whereby the work may be held down in the work-holder during the application of the welding or forming pressure.

44. In an electric metal-working apparatus, the combination with a pair of electrodes adjustable into and out of contact with the work simultaneously of actuating devices and a pressure-equalizing lever between the actuating devices and said electrodes.

45. In an electric metal-working apparatus, the combination with a pair of contact slides or carriers, of projection-studs extending from the same freely through a yoke or lever, means for applying pressure to an intermediate portion of the lever or yoke, and springs interposed between the ends of said yoke or lever and the slides.

46. In an electric metal-working apparatus, the combination of an equalizing yoke or lever, contact slides or carriers, studs mounted on said carriers and passing through opposite ends of the equalizing yoke or lever, yoke-retaining collars secured to the studs at the outside of the yoke and compression-springs mounted on the studs and interposed between the yoke and the slides or carriers.

47. In an electric metal-working apparatus, the combination with a pair of contact-electrodes and actuating devices common to the same, of equalizing pressure-springs between said contact-electrodes respectively and their common actuating device.

48. In an electric metal-working apparatus, the combination with work-holders, of independently-mounted contact-electrodes, an actuating device for bringing the same into contact with the work and equalizing pressure-springs interposed between said contact-electrodes and their actuating mechanism.

49. In an electric metal-working apparatus, the combination with the contact-electrode adjustable laterally into and out of contact with the work, of an actuating device and an interposed spring adapted to provide a yielding and following contact.

50. In an electric metal-working apparatus, the combination with a transformer, of contact-bearing slides or carriers movable on the terminals thereof, a carrier-actuating bell-crank and an actuating-treadle connected with the latter as and for the purpose described.

51. In an electric metal-working apparatus, the combination with work-holders, of a transformer, contact-electrodes mounted on slides moving on the terminals of said transformer, an equalizing lever or yoke, a bell-crank lever engaged therewith and an actuating-treadle, as and for the purpose described.

52. In an electric metal-working apparatus, the combination with the simultaneously-adjustable contact-electrodes, of the equalizing yoke or lever and an actuating-lever engaging therewith by a surface having a circular or curved outline.

53. In an electric metal-working apparatus, the combination with the work-holders for the work to be heated, of an anvil-carrying slide or support and an anvil replaceable and reversible in position in said support.

54. In an electric metal-working apparatus, the combination with a pair of work-holders, of an anvil-carrying support mounted beneath and intermediate the same, and a double-ended anvil reversible on said support, as and for the purpose described.

55. In an electric metal-working apparatus, an anvil having two die or forming faces and replaceably mounted on a suitable vertically-adjustable support with its longitudinal axis disposed at right angles to the line in which the work-holders move.

56. In an electric metal-working apparatus, the combination with the vertically-adjustable die post or support, of a replaceable hammer-die mounted in a slot therein whose axis is transverse to the line of movement of the work-holders of the apparatus.

57. In an electric metal-working apparatus, the combination with a replaceable hammer-die, of a vertically-adjustable die post or support provided with a die holding slot the outer or clamping portion of which is deeper than the inner portion where the working part of the die is located.

58. The combination in electric metal-working apparatus, of a reversible hammer-die, a die post or support having a slot to receive the same and higher at its forward or outer portion where it receives the clamping-plate for the hammer-die.

59. The combination with the reversible hammer-die 7, of the die-post 8, a clamping-plate 118 resting on an elevated part of the die-post and provided with a bearing, and a ledge running along its edge, as and for the purpose described.

60. In an electric metal-working apparatus, the combination with the hammer-die having working faces at opposite ends, of a die-supporting post having a slot adapted to receive the die and provided with a dowel-pin, a clamp carried by an elevated portion of the post and a clamping-stud projecting from said post through the clamping-plate.

61. The combination with a reversible and replaceable hammer and die, of the vertically-adjustable die-post having an elevated portion to receive the clamping-plate and provided on such elevated portion with a clamp post and pin to enter the clamping-plate and prevent angular displacement of the same.

62. In an electric metal-working apparatus, the combination with the work-holders, of a die mounted on a slide beneath the work-holders and provided at its end with a semicircular or bur-reducing recess.

63. In an electric metal-working apparatus, the combination with work-holders adapted to hold a chain-link, of a link-finishing die mounted on a vertical slide or support beneath and between the work-holders and provided with a semicircular clearance-recess for the unwelded portion of the link.

64. In an electric metal-working apparatus, a link-finishing die having interchangeable ends and provided with two link-finishing recesses $7^a$, and two clearance-recesses $7^b$.

65. In an electric metal-working apparatus, the combination with a pair of work-holders, of a vertically-adjustable finishing-die mounted between them and provided with die-finishing recesses and clearance-recesses, as and for the purpose described.

66. In an electric metal-working apparatus, the combination with a vertically-adjustable die-holding slide, of a reversible die mounted with its longitudinal axis transverse to the line of movement of the work-holders and having in its opposite edges and ends suitable die or forming recesses.

67. The combination of the finishing-die which supports the work, of a lifting-cam, a rock-shaft carrying the same, an actuating-lever for said rock-shaft, a trip-pawl connected to said lever, an upper finishing-die and actuating mechanism, and a power-controlling device therefor operated by said trip-pawl when the said lever is actuated to cause the cam to lift and immovably support the lower finishing-die.

68. In an electric metal-working apparatus, the combination with the finishing-lever and the supporting finishing-die actuated by the same, of an opposite finishing-die, actuating power therefor, a power-controlling device having a trip projection as described and a trip-pawl carried or operated by the finishing-lever.

69. In an electric metal-working apparatus, the combination substantially as described, with a work-supporting hammer-die and a slide carrying the same and adapted to move it into and out of position between the work-holders in which the work is heated, of an actuating-lever, means connected therewith for immovably supporting the die when engaged with the work, a hammer-die and actuating mechanism, a power-controlling device, and means connected with the lever for operating said power-controlling device.

70. The combination substantially as described of the lower hammer-die, a slide, a lifting-cam carried on a rock-shaft and adapted to immovably support said die, a finishing-lever linked to said rock-shaft, an upper hammer-die, actuating mechanism for the same and means for controlling the operation of said hammer connected with the lever which operates the rock-shaft and adjusted as described to bring the hammer into action after the lower hammer-die is set.

71. In an electric metal-working apparatus, the combination with the work-holding slide or carrier and the current-controlling device connected therewith, of intermediate mechanism for giving an amplified movement to said current-controlling device.

72. In an electric metal-working apparatus, the combination with the work-holder and its actuating-lever, of means interposed between the lever and work-holder for multiplying the pressure on the heated work and a current-controlling device connected directly with the lever.

73. In an electric metal-working apparatus, the combination with a work-holder and actuating-lever, of a double toggle intermediate the work-holder and lever, and a current-controlling device connected directly with the lever.

74. In an electric metal-working apparatus, the combination with the work-holders, of a transformer having contact carriers or slides slidably mounted on the terminals of a secondary and provided at their contact ends with comparatively small conductors slidably mounted upon the large conductors constituting the carriers and adapted to engage the work between the work-holders.

75. In an electric metal-working apparatus, the combination of a pair of work-holders having engaging surfaces adapted to locate the work and effect a clamping of the same by end pressure, laterally-disposed contact-electrodes mounted on suitable slides or carriers adjustable transversely to the line of pressure to bring said electrodes into and out of contact with the work, finishing-dies disposed respectively above and below the work-holders, and means for bringing the same into and out of contact with the work after the same has been heated and subjected to pressure in the work-holders.

76. In an electric metal-working apparatus, the combination substantially as described of a pair of work-holders, means for moving one of them longitudinally toward the other, independently-mounted contact-electrodes adjustable laterally into and out of engagement with the work, a pair of vertically-disposed finishing-dies, means for lifting one of them toward the space between the work-holders to support the work, and a power-controlling device for governing the action of the opposite finishing-die.

77. In an electric metal-working apparatus, the combination substantially as described of a pair of work-holders, means for moving one of them longitudinally toward the other, independently-mounted contact-electrodes adjustable laterally into and out of engagement with the work, a pair of vertically-disposed finishing-dies, means for lifting one of them toward the space between the work-holders to support the work, a power-controlling device for governing the action of the opposite finishing-die, and means common to said dies for lifting the lower one of them and for operating the power-controlling devices of the other.

78. In an electric welding-machine for welding links or other endless forms, the combination of a pair of work-holders having work-holding channels or recesses adapted to center the work and permit the application of end pressure to the link for welding the same, contact-electrodes for supplying current to the work and laterally adjustable into and out of contact with the same as described, a lower hammer-die for supporting the work, a slide carrying the same and suitably mounted on the framework, an upper hammer-die, an actuating power, a power-controlling device and means for lifting the lower hammer-die and operating the power-controlling device by the action of the same handle or lever.

79. In an electric metal-working apparatus, the combination of a contact-electrode adjustable into and out of contact with the work while clamped in the work-holders, an actuating-treadle and an interposed spring to produce uniform pressure by the action of the treadle.

80. In an electric welding apparatus, the combination of a pair of contacts and means for bringing them simultaneously into contact with the work, of means for equalizing the pressure of said contacts upon the work.

81. The combination in an electric welding apparatus, of a controlling device for the automatic cut-off mechanism and a work-holder connected therewith through motion-multiplying devices.

Signed at Lynn, in the county of Essex and State of Massachusetts, this 2d day of October, A. D. 1903.

ADOLPH F. RIETZEL.

Witnesses:
   GEO. W. N. CHADWELL,
   C. I. LINDSEY.